United States Patent [19]

Haynes et al.

[11] Patent Number: 4,457,772
[45] Date of Patent: Jul. 3, 1984

[54] MANAGEMENT CONTROL SYSTEM FOR FORMING GLASSWARE

[75] Inventors: James D. Haynes; Jerome A. Kwiatkowski; Glen H. Mapes, all of Muncie, Ind.

[73] Assignee: Ball Corporation, Muncie, Ind.

[21] Appl. No.: 468,457

[22] Filed: Feb. 22, 1983

Related U.S. Application Data

[63] Continuation of Ser. No. 281,466, Jul. 8, 1981, abandoned.

[51] Int. Cl.$^3$ ................................................ C03B 9/40
[52] U.S. Cl. .......................................... 65/160; 65/29; 65/162; 65/163; 65/164; 65/DIG. 13; 364/473; 364/476
[58] Field of Search .................... 65/29, 162, 163, 164, 65/DIG. 13, 160, 159; 364/473, 476

[56] References Cited

U.S. PATENT DOCUMENTS

| | | | |
|---|---|---|---|
| 3,779,731 | 12/1973 | Pollock et al. | 65/162 X |
| 3,805,244 | 4/1974 | Tooka | 364/469 X |
| 4,152,134 | 5/1979 | Dowling et al. | 65/163 |
| 4,252,754 | 2/1981 | Nakaguchi et al. | 65/27 X |
| 4,369,052 | 1/1983 | Hotmer | 65/DIG. 13 |

FOREIGN PATENT DOCUMENTS 2033607 1/1972 Fed. Rep. of Germany ...... 364/469

*Primary Examiner*—Arthur D. Kellogg
*Attorney, Agent, or Firm*—Gilbert E. Alberding

[57] ABSTRACT

The present invention is a computer control system for a glass factory having a plurality of individual section glassware forming machines. The glass factory control system preferably comprises four microprocessor systems, respectively responsible for overall factory control, overall shop control, individual shop control and individual section control. At the most general level, a microprocessor called the factory supervisory computer performs such functions as scheduling jobs, controlling inventory, forecasting sales, determining fuel availability and cost, performing IS machine simulation and providing maintenance information. At the next level, another microprocessor called the console computer stores and manages all job history files, provides shop status information on demand and collects selected production data. Each shop computer performs such functions as controlling a stacker motor, monitoring temperatures, storing section status information and storing job timing information in nonvolatile storage. At the most specific level, each section computer controls the glassware forming mechanism of the associated individual section. In organization, the supervisory computer is connected to the console computer and to the various production support and monitoring systems common to the factory. The console computer is connected to each of the shop computers and also to the various production support and monitoring systems common to the factory. Each shop computer is connected to a plurality of section computers under its auspices and to the monitoring systems of the associated shop. Each section computer is connected to its associated individual section and to monitoring systems specific to the associated section.

9 Claims, 15 Drawing Figures

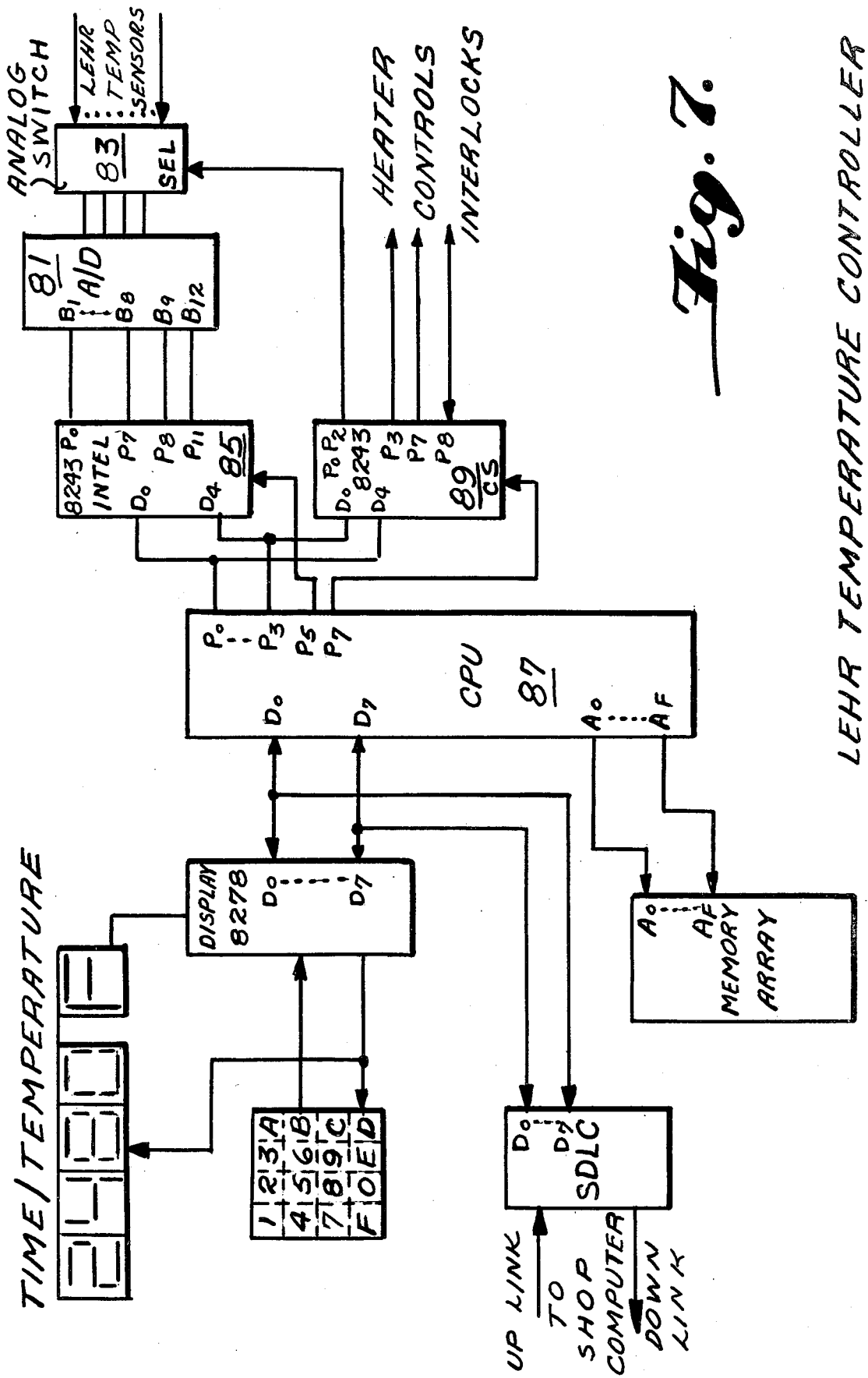

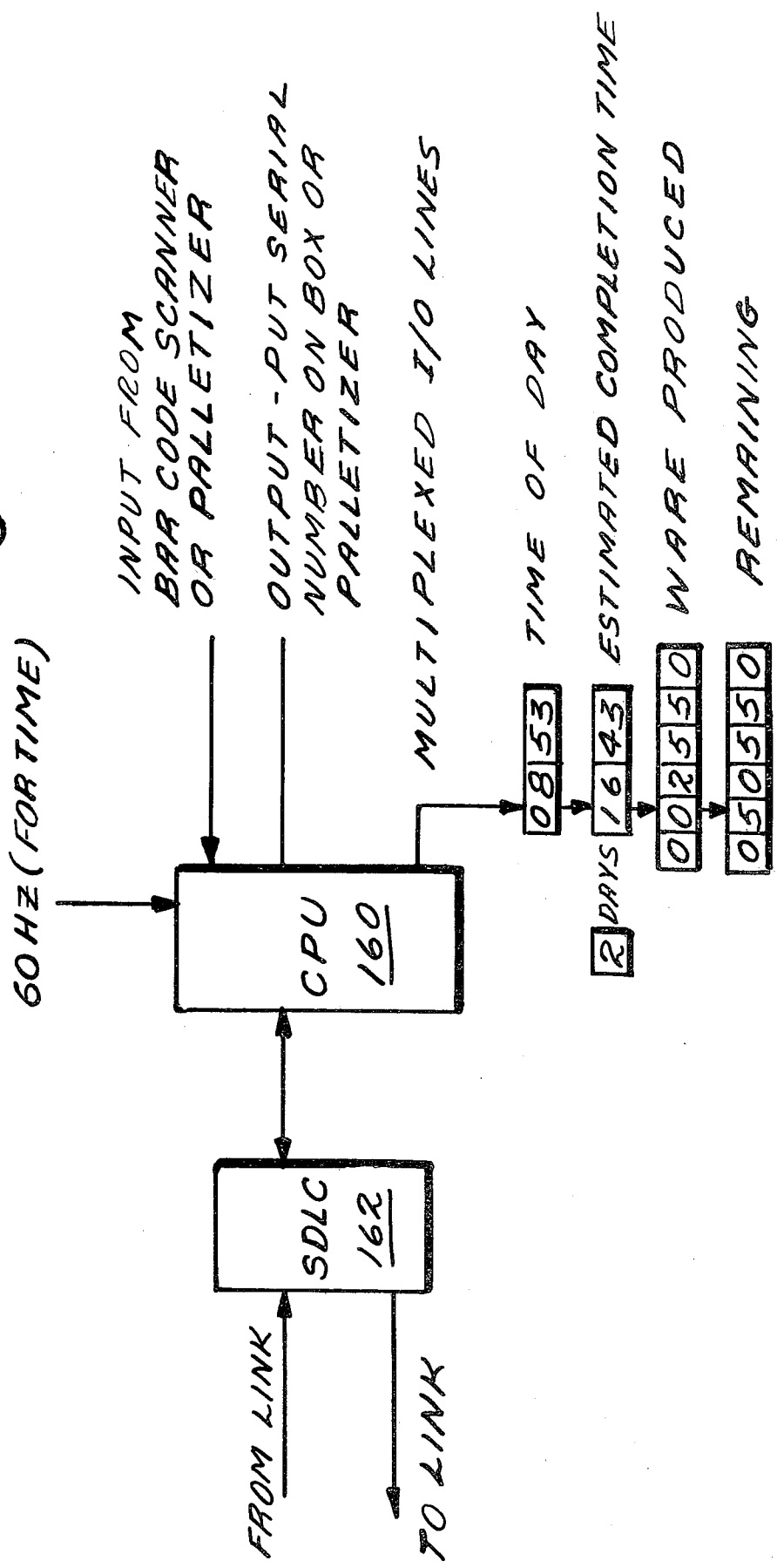

MANAGEMENT CONTROL SYSTEM FOR FORMING GLASSWARE

This application is a continuation of application Ser. No. 06/281,466, filed July 8, 1981 now abandoned.

BACKGROUND OF THE INVENTION

The present invention relates to a method and apparatus for scheduling, synchronizing and controlling the operations of a glassware forming system wherein raw materials are thermodynamically converted to glass containers and packaged. The system includes the control of a plurality of multisectioned machines called IS machines. The system also includes a furnace and forehearth for forming molten glass and a lehr for annealing the glass containers. More particularly, this system relates to a computer control system for controlling the formation of molten glass and for thermodynamically converting the molten glass to glassware containers. Techniques for forming molten glass from raw materials are known. They include initially weighing and mixing in proper proportions the raw materials which form glass. In the prior art this was done on a batch basis and the mix was conveyed to a furnace where the mixture was melted and a homogeneous composition of molten glass was thus formed. The molten glass was then fed to one or more forehearths where the molten glass was cooled to the proper temperature for a particular job, i.e., for processing in a glass container forming process. After reaching the appropriate temperature, the molten glass was forced through one or more orifices in a feeder mechanism and was appropriately shaped by the orifice. The charge of glass forced through the orifice was sheared by a gob shear mechanism to form gobs of molten glass. The gobs were then distributed on a sequential basis to each of a plurality of sections of a multi-sectioned glass container forming machine, called an IS machine.

In the individual section glassware forming machine, a plurality of individual glassware forming sections operate on an interdependent timed basis. The operating cycles of the individual sections are phased with one another for the purpose of maximizing the rate of thermodynamic conversion of molten glass to glass containers. Gobs of hot glass are fed to the individual sections of the IS machine in sequence from the feeder. As one of the individual sections is receiving a gob, another individual section is delivering a freshly molded article to a conveyor system. The other individual sections are engaged in various steps which are intermediate between receiving a gob and delivering ware to the conveyor. An example of one such glassware forming machine is disclosed in U.S. Pat. No. 1,911,119, issued to Ingle on May 23, 1933.

The Ingle glassware forming machine was originally controlled by a mechanical timing drum. However, in the recent past, certain electronic control systems associated with glassware forming machines have been developed which are synchronized to the mechanical operations of the machine. For example, in one prior IS machine system, an operator manually adjusted and controlled certain motors in the machine and the electronic control system sensed the position of a component of the machine for deriving speed information. Specifically, speed information was measured by a shaft encoder or similar device to generate a pulse which could be used as a basis for determining the operating stage of the IS machine in the glassware forming cycle. Such a system is disclosed in U.S. Pat. No. 3,762,907, issued to Quinn et al on Oct. 2, 1973. Thus, the control electronics were synchronized to the control motors of the glassware forming machine. The commonly assigned copending application of Wood, Ser. No. 281,565 discloses a programmable timing controller for an IS machine which is not synchronized to a shaft encoder. This Wood invention can be conveniently used in conjunction with the present invention and the disclosure of the Wood application is incorporated herein by reference thereto.

The glass containers formed by the IS machine are conveyed from the IS machine to a lehr where the containers are "stacked" in rows and annealed. At the output of the lehr, the containers are tested for defects and packaged for shipment to customers.

The operating procedures of prior art control systems are unsatisfactory in several respects. For example, there was no way in which one could accurately control the proper rate and amount of molten glass being formed dependent upon the "pull" of the multi-section machines. Further, with companies having glass plants in a number of locations, plant utilization is determined on an independent basis without central coordination so that plant utilization is not as efficient as possible.

With respect to the IS machines, in one IS machine controller, each job change required the operator to manually set the timing of components relating to the production and transfer of the glassware for each individual section. Significant opportunity for human error thus existed during set-up. Furthermore, job changes, include adjustment of the fluid pressure supplied to various operating valves in the valve block. Furthermore, timing changes during operation are time consuming and must be done by an operator in close contact with the mechanical systems of the machine.

Because of the dispersed, as opposed to centralized, control in the prior art of each IS machine, the complexities of job scheduling to achieve the most efficient and cost effective manufacture of the glass containers was aggravated. Job scheduling involves monitoring the availability of raw materials, availability of molds for a given container type, consideration of the ultimate destination of manufactured ware, and the current demand on machine time considering the jobs in progress. Effective job scheduling presently requires close cooperation between all operating personnel and is seriously jeopardized by any operator inattention and/or error.

Accordingly, there is need in the art for an improved control system for controlling the forming of glass containers including the operation of the furnace, forehearth, the IS machines and the lehrs which system will avoid the problems associated with job changes, operating parameter changes during operation and which will facilitate economical use of glassware forming machinery, and provide improved job scheduling in the glass factory.

SUMMARY OF THE PRESENT INVENTION

Accordingly, the present invention relates to an improved control system for the formation of glass containers. The system includes a first central controller for controlling the operation of a batching and raw material storage system. The raw materials are mixed in proportions required by the first central controller, and either briquetted or fed in a controlled manner to the furnace. The rate at which the mixed raw materials or briquettes are fed to the furnace depends upon the pull of molten glass from the furnace by a plurality of IS machines. The pull rate is controlled and monitored by the central controller.

The temperature of the furnace and forehearth is monitored and controlled by the central controller with the temperature of the molten glass in the forehearth depending upon the type of glassware containers being formed. Thus, the size of the gob and the temperature will vary depending upon the type of container formed and temperature control of the furnace and forehearth is thus controlled accordingly.

A plurality of IS machines receive glass from the furnace via a forehearth associated with each machine. Each IS machine has a plurality of section controllers for controlling the timing of machine functions. Preferably, a machine controller, called a shop computer, controls each of the section controllers and controls the phasing of each of the sections. In addition, a bottle gauger, mold temperature sensors and a mold reader are provided which provide input to the shop computer which in response thereto provides control commands to the section controllers to change timing and/or pressure level for the valve block to correct defects in the glass containers. The shop computer also provides information to the central controller to cause the temperature of the molten glass to be changed. Thus, the shop computer controls the operation of its associated IS machine depending upon the type of glassware being formed. The shop computer also provides housekeeping data to the central controller to inform the controller of the number of containers formed, the defects therein and the status of each section of the associated machine.

An intermediate computer, called a console computer, is preferably provided to serve as a buffer and interface between the central control and shop computers. The console computer serves, also, as an operator interface to permit operator control of the various shop computers and to provide the operator with information not only from the shop computers but from the central controller.

In one embodiment of the invention, a running record is made of the number of containers made in a given job together with a running record of the cost of manufacturing the containers. From this data the optimum length of run of a given job is determined by taking into account not only inventory costs but also manufacturing costs.

BRIEF DESCRIPTION OF THE DRAWINGS

Other objects, features, and advantages of the present invention will become more fully apparent from the following detailed description of the preferred embodiment, the appended claims, and the accompanying drawings in which:

DETAILED DESCRIPTION OF THE PREFERRED EMBODIMENT

Figure 1:
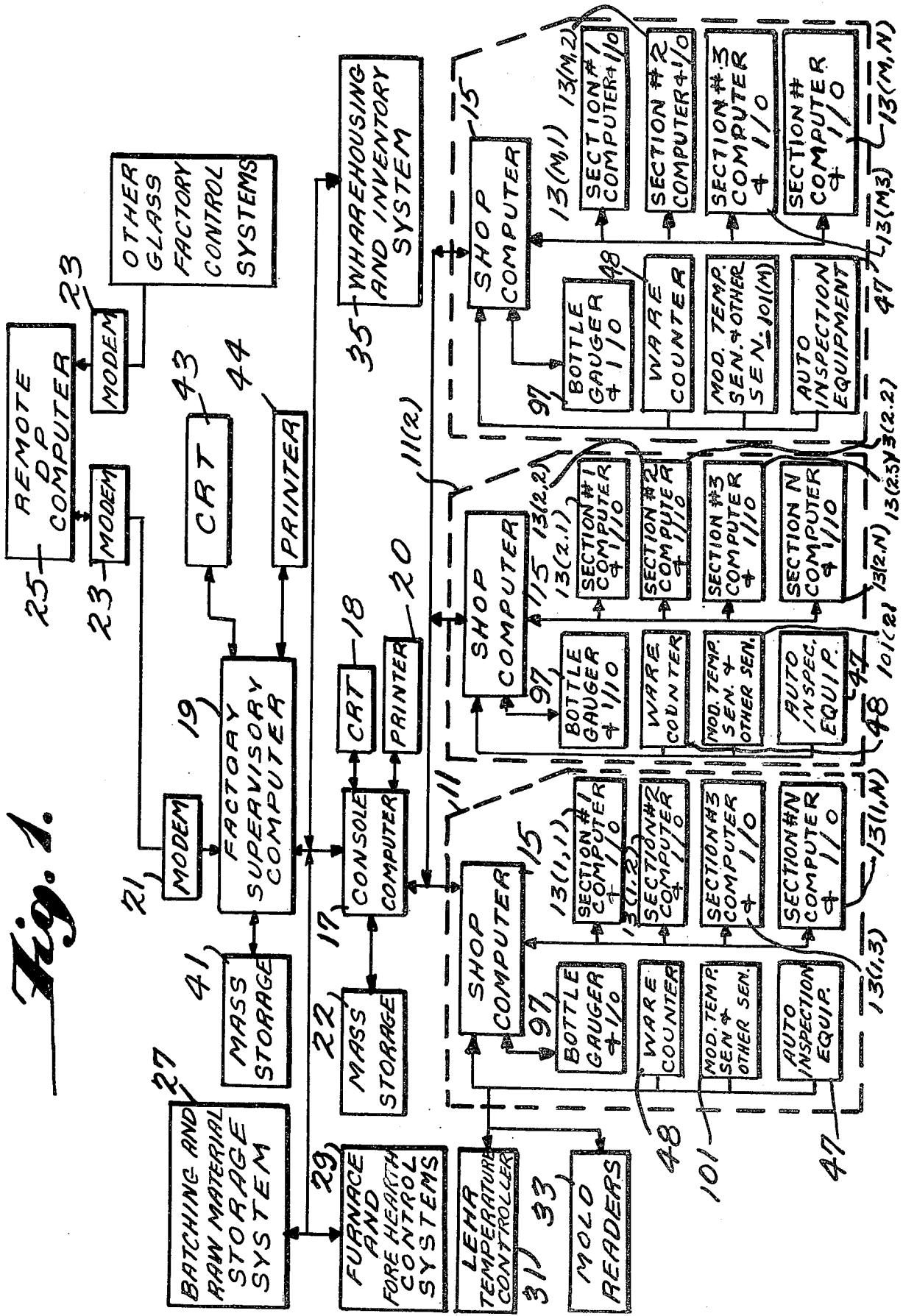
FIG. 1 is a block diagram of the preferred embodiment of a glass factory control system according to the present invention.

The glass factory control system of the present invention preferably comprises a four level computer control system having four microprocessor systems, each dedicated to specific tasks. At the highest level of control, the system controls overall factory operations, including the control of batching and mixing of raw materials, control of the furnace operations, control of the glassware container forming equipment and inventory control. At the next highest level is the control of overall shop operations (each shop comprises a single glass forming machine). At the next highest level is the individual control of the shops including the correction of machine timing depending on detected defects in manufactured containers, and at the lowest level is the individual control of the individual sections of each IS machine. It is to be understood, however, that instead of the aforementioned distributed control system, the present invention also contemplates the use of a single, very fast processor to perform all tasks, although such an embodiment is not presently preferred because of the economics of utilizing several small computers rather than a single large computer.

By way of background, a glass factory typically comprises a plurality of shops. Each shop includes an IS machine having typically 6, 8 or 10 sections. Each shop also includes an associated control system, various monitors, and other hardware, such as valve blocks. With respect to FIG. 1, the shops are indicated in phantom and are assigned the reference numeral 11(n), where n is a number from 1 to n, and n typically has a value from 5 to 10. Since the shops 11(n) are substantially identical to one another, reference is hereafter made to a shop 11, it being understood that the construction and operation of the shops 11(n) are substantially identical to the shop 11.

In the following description, the interrelationships between the various microprocessor systems of the preferred embodiment are briefly described, followed by a detailed description of the construction and operation of each of the microprocessor systems. It is to be understood that each microprocessor system comprises system elements linked by data and/or control lines and is connected to other microprocessor systems by data lines and, in some instances, control lines. In the interest of clarity, FIG. 1 shows only system elements and associated data lines and omits the specific control system elements and lines, the individual sections, the valve blocks, and other elements which are part of the shop 11.

The Interrelation of the Microprocessors

Each individual section of the IS machine is controlled by a section computer, indicated in FIG. 1 as 13(X), where X indicates the number of the sections within shop 11. The value of X is typically 6, 8 or 10. As the section computers 13(X) are substantially identical to one another, only one section computer 13 will be described in detail, it being understood that the construction and operation of the section computers 13(X) are substantially identical to the section computer 13. The section computer 13 provides timing control information to an associated individual section of the IS machine.

A shop computer 15(n), where n indicates the number of the shop as described above, interfaces the plurality of section computers 13 in shop 11 to an external console computer 17. It also, receives data from a bottle defect detecting mechanism 97, called a bottle gauger, from the various elements of the machine such as the molds, neck ring plunger, etc., and from a ware counter and automatic inspection equipment 47. The shop computer 15 and the section computers 13 preferably communicate through a serial bi-directional data link. The shop computer 15 also performs other functions, as described in detail below.

The console computer 17 interfaces each of the shop computers 15 to an operator control and to a central factory supervisory computer 19. The console computer 17 also performs other functions as described below. The console computer 17 and the shop computers 15 preferably communicate through a serial bi-directional data link.

The factory supervisory computer 19 communicates with the console computer 17 through a serial bi-directional data link. The supervisory computer 19 is responsive to an operator control, and also is connected by a telephone line (suitably equipped with modems 21 and 23) to a remote large data processing computer 25 for down loading current inventory, factory status, and payroll information. This line is also used to transmit to the supervisory computer 21 a proposed production schedule.

At this juncture, it is necessary to identify the three different types of operators in a glass factory, each type corresponding to a respective principal task. The factory operator monitors and manipulates overall factory operations, the console operator monitors and manipulates the glassware forming processes and related production events, and the shop operator monitors the performance of an IS machine, and adjusts the functions of the individual section. Although the present invention contemplates that a single person could fill all three roles, it is preferable—a practical necessity in a large factory having several shops and multiple microprocessors—for the factory operator, the console operator, and the several shop operators to be different individuals.

The Factory Supervisory Computer

The factory supervisory computer 19 controls the overall operation of the factory. Thus, the tasks performed by the computer 19 include scheduling jobs for each of the shops, controlling and determining inventory, providing job status information and providing maintenance information. The supervisory computer 19 is capable of accessing the job history files for each type of container manufactured, and reading the status of all shops 11(n), although these tasks principally are assigned to the console computer 17 and are described in detail in connection therewith.

For purposes of this invention, the primary functions of the supervisory computer are to schedule jobs for the entire factory, preferably determining the complete production run for an entire week. The task of job scheduling requires information regarding raw batch materials on hand, finished ware on hand and cost, the status of current jobs being run in each shop and and maintenance information. Job scheduling further requires predicting job completion times for currently running jobs. Job completion times are based on present production rates, the running storage capacity of the lehr, quantity of finished ware and the desired quantity of a particular type of ware to be produced. This information is supplied by certain monitors and production support systems, for example, the ware counter 38 and the warehouse and inventory system 35.

Having determined a job schedule, the supervisory computer 19 instructs the console computer 17 at appropriate times to load the shop computers 15 with specified job information in accordance with the job schedule. This "automatic job load" feature is described in detail below, in connection with the console computer 17. The supervisory computer 19 additionally notifies the warehousing and inventory system 35, a production support system, of the pending jobs and locations so that the required components (for example, suitable molds) are directed to the appropriate shops 11 to facilitate refitting. The warehousing and inventory system 35 additionally provides feedback to the computer 19 to indicate at any given time the quantity of ware produced in accordance with the job schedule.

The present invention contemplates that jobs may be independently initiated at a particular time or dependently initiated based on the predicted completion time of a preceding job. The supervisory computer 19 also communicates with the batching and raw material computer and the furnace and forehearth control. The purpose for this is to inform the batching and raw material computer to control the proper mixture of raw materials for the job and to indicate how much mixture is required by the furnace depending upon the "pull" of molten glass by the IS machines. Communication with the furnace and forhearth is to control the temperature and rate of feed of the molten glass for any given job. In this connection, a High Level Data Link (HDLC) is used. HDLC is the standard communication link protocol established by the International Standards Organization (ISO) and is the protocol used to implement the ISO×0.25 packet switching system utilized in the preferred embodiment. As an alternative, a Synchronous Data Link Control (SDLC) may be used which is an IBM communication link protocol used to implement the System Network Architecture. Both the HDLC and SDLC protocols are bit oriented, code independent, and ideally suited for full duplex communications.

In both the HDLC and SDLC line protocols, a primary control station. i.e., the supervisory computer 19, controls the overall network data links and issues commands to the secondary stations, e.g., the console computer, the furnace control system, etc. The latter secondary stations comply with the instructions issued by the supervisory computer and respond by sending appropriate responses back to the supervisory computer 19. Whenever a transmitting computer must end transmission of data or instructions prematurely, it sends an abort command.

Briefly, the communications format operates as follows. All communications in the loop, including the batching and raw material computer, the furnace control, the console computer and the warehousing and inventory control, are all controlled by the loop controller of the supervisory computer 19. When the loop controller polls the devices (computers) on its loop, the controller sends a polling frame having a control field with a poll code followed by an end-of-poll (EOP) command. The secondary or polled devices use the EOP character to capture the loop and insert a response frame. The polled (secondary) devices normally operate in a repeater mode, retransmitting received data with a one bit time delay. This one bit time delay serves to capture the loop. All of the received frames are repeated on to the next device.

If the controller polls the devices, a polling frame followed by all 1's is transmitted to the secondary devices. The final zero of the closing frame plus the first seven 1's form an EOP. When an EOP is received, the secondary device checks to determine if it has any response for the controller; if not, it simply continues repeating the frame. If, however, the secondary has a response, it changes the seventh digit, i.e., the 1 to a 0, and repeats it to the remaining devices to form a flag for the down-loop devices. After this flag has been transmitted, the secondary terminates its repeater function and inserts its response frame. After the closing flag of the response, the secondary reenters its repeat mode and repeats the up-loop controller's 1's. The final zero of the response's closing flag plus the repeated 1's from the controller form a new EOP for the next down-loop device. This new EOP allows the next secondary to insert a response, if necessary.

Meanwhile, the supervisory computer waits until it receives an EOP. Receiving an EOP signifies to the computer that the original frame has propogated around the loop followed by any responses inserted by the down-loop devices.

Should the controller desire to communicate with a specific down-loop device, that device code is inserted into the address field. The frame is then transmitted around the loop. If the secondary device is not the one addressed, it repeats the frame down-loop until the addressed secondary device detects a match in its address field with that of the transmitted frame. The secondary device's processor is informed of the inquiry and when the EOP character is received, the secondary processor issues a loop transmit command with the reply message or data.

The supervisory computer 19 also performs a number of housekeeping tasks. By periodically receiving reports from the console computer 17, the supervisory computer presents information to management which facilitates ascertaining the condition of each IS machine in the factory and determines the time for appropriate repairs and/or maintenance work. This information may be transmitted to a remote computer 25 which may be located, for example, at corporate headquarters. The computer 19 also provides commands to the shop computer via the console computer 17. Thus, having determined present production rates and lehr storage capacity, the supervisory computer 19 instructs the console computer 17 to shut down a shop before the lehr is empty and to make appropriate operating time changes to the individual sections. The computer 19 also instructs the furnace and forehearth control system 29 to adjust the temperature to accommodate the new pull rate on the furnace; the lehr temperature controller 31 to adjust the lehr profile; and the warehousing and inventory system 35 to initiate the making of boxes for a job being started.

As shown in FIG. 1, the supervisory computer 19 is coupled to a mass storage device 41 for storing and retrieving data. The factory supervisory computer 19 also is connected to a CRT terminal 43 for communicating control information and data between the supervisory computer 19 and a factory operator, and to a printer 44 for providing output information in document form, i.e., "hard-copy" output information.

The Console Computer

The console computer 17 stores and manages all job history files, interfaces the console operator and the supervisory computer 19 with various production support systems, monitors the shops, provides shop status information on demand to the console operator and to the supervisory computer 19, and collects selected production data. A CRT terminal 18 is connected to the console computer 17 for communicating control information and data between the console computer 17 and the console operator. The printer 20 is connected to the console computer 17 to provide output information in document form. The console computer 17 also is connected to a mass storage device 22 for storing and retrieving data. The console computer 17 also is connected to the batching and raw material storage system 27, the furnace and forehearth control system 29 and the warehousing and inventory system 35 to, in some instances, furnish instructions and in other instances acquire information for the various tasks assigned to the console computer 17. The console computer 17 is connected to the shop computers 15 through a serial bi-directional data link.

The purpose, construction, and operation of the I/O devices 18, 20 and 22 are well known in the art. In accordance with the present invention, the console operator selects the command number from a command summary message table and enters the command number through the keyboard of terminal 18. Command options are then displayed to the console operator. The major commands include:

1. load a job setup routine from disk storage 22 to a selected shop computer 15;
2. copy a current job setup established for one section to the other sections of a shop;
3. store a job history from a shop in a disk in mass storage 22;
4. create or modify jobs;
5. print or display user files and reports;
6. copy files from disk to disk in memory 22;
7. establish system initialization;
8. provide stacker information relating to the lehr;
9. provide stop status; and
10. observe the output from the bottle gauger.

The present invention contemplates three distinct phases of operation, each implemented by a computer program which is executed by the console computer 17. These phases are "job set-up", "job start-up", and "job run". The console computer 17 at all times is operating in one of these phases and typically implements the phases in sequence, although the sequence may be executed in indeterminate number of times. Of course verification of the implementation of each phase is necessary before implementation of the next phase begins.

As mentioned above, the console computer 17 stores and manages all job history files and is an interface between the console operator and the shops. Accordingly, all job history files are stored in the mass storage device 22 (duplicate files may be maintained in a second storage device if desired, such as storage 11, and job history files can be created, deleted, or edited by the operator. Each job history filed includes:
1. the function name table number for each function of the IS machine;
2. the driver assignment table number for each valve driver in the IS machine;
3. function timing for each function of the IS machine;
4. program start number;
5. program stop number;
6. previous speed settings for the gob distributor, feeder, and conveyor motors for the particular job; and
7. stacker control information. The above terms are defined in the copending application of the present assignee Ser. No. 281,500, Mapes et al.

The present invention facilitates initiating jobs and changing to a new job since the previous job history for the particular type of container has already been stored. If a job history file exists, the console operator need enter only the shop number, section number or numbers, quantity of glassware to be produced, and job history file number through the terminal 18. Having entered the job set-up phase, the console computer 17 will retrieve that job history from the mass storage device 22 and perform the following actions:
1. Check for the valid driver assignment table number, the start and stop program numbers.
2. If the numbers are valid, the console operator will retrieve these program numbers and send the data to the requested shop and section or sections.
3. Down-load the timing program, i.e., function timing and function table numbers, associated with a selected job run to the appropriate memories in the section computers 13 and the shop computers 15.
4. Provide the gob distributor, shear, and conveyor motor controls with speed data.

The first step is to validate the assignment of drivers and the start and stop routine for any given job. In the second step, assuming validation is complete, the driver assignment table and the start and stop routines are loaded into the respective shop and section processors. Next, in the third step, function timing data is sent to the appropriate section computer or computers 13. In addition, adjustment in accordance with the selected job of the pressures supplied to various operating valves by the valve block is ordered. The type of container being produced information is supplied to a plurality of bottle gaugers 97, described below, through respective shop computers 15 to ready the bottle gaugers 97 without detailed assistance from the shop operator. Data for controlling the operation of stackers (not shown) is supplied to the shop computers 15 involved. In the fourth step, the speed control information is provided to the shop computer 15 for controlling the gob distributor, the shears and the conveyor motors.

If a job history file for the selected job has not been created and stored, the entire timing program for the job must be loaded into the console computer 17 from the supervisory computer 19 or manually from the input 18.

As described above, the console computer 17 is an interface between the factory supervisory computer 19 and the individual shop computers 15. The present invention contemplates an automatic job load feature whereby the supervisory computer 19 may initiate or change jobs without console or factory operator intervention. Having determined that a job change is in order, the supervisory computer 19 sends the console computer 17 the job number, shop numbers, section numbers, quantity of bottles to be produced and the job starting time. The console computer 17 then automatically loads the specified shops and sections with the job information at the specified time.

According to the present invention, the console computer 17 under program control performs additional tasks during the set-up phase. One such task is to guide a shop operator in installing molds in the individual sections of an IS machine. For example, the console computer 17 provides mold installation instructions to the shop operator of a selected shop 11. Subsequent steps are suspended until the shop operator indicates that the molds are properly in place. The set-up phase resumes under program control until further operator tasks are required. Opportunity for human error thereby is reduced in mold installation during job initiation and job change.

According to the present invention, the console computer 17 under program control performs additional tasks during the start-up phase. One such task is to minimize the peak electional load level of the glass factory by optimizing the start-up sequence of the various electrical components of the IS machines in the glass factory. For example, the various motors of the IS machines in the glass factory are energized in sequential order to minimize the peak load factor. Another such task is to minimize power consumption throughout the plant by anticipating the start time of various machines in the plant. For example, informed from past experience of the time needed to bring the lehrs to operating temperature and using start-up time information provided by the supervisory computer 19, the console computer 17 initiates lehr heating in anticipation of having the lehrs at proper operating temperatures at the moment glass production is scheduled to begin. Excessive heat loss to the plant environment thereby is avoided. Most importantly, during the job start-up phase, the start program for each section is implemented.

During the run phase, the normal run routine is implemented. During this phase, the console computer 17 provides shop status information on demand and collects selected production data. For the latter purpose, the console computer 17 is connected to a plurality of production support systems such as the warehousing and inventory system 35, the batching and raw material storage system 27, and via the shop computers 15 to monitors such as the mold reader 33 and ware counter 48. For the former purpose, the console computer 17 and the shop computers 15 are connected through a serial bi-directional data link. A shop read command is entered by the console operator or by the supervisory computer 19 to initiate collection of shop status information.

Job status information is automatically determined periodically. In accordance with information gathered by the console computer 17, the console computer computes every predetermined time period, such as every two minutes, such production information as the number of bottles produced per shop, total bottles produced, total bottles packed, the pack rate and estimated job completion time. Estimated job completion time is determined in the same manner as the supervisory computer 19 determines it, as described above. For example, the console computer 17 counts the number of full boxes and multiplies this count by the number of bottles per box to determine the production completed. The number of boxes is subtracted from the total number of boxes required for job completion. The job completion time will be based on the number of boxes to be filled divided by the production rate taking into account the number of bottles in the lehr and in transit to the packaging location, minus bottles rejected.

Status information for each job is displayed at the system I/O device or sent to the supervisory computer 19. The status parameters are:
1. total bottles produced;
2. total of good bottles produced, determined by the product of the box count and the number of bottles per box;
3. total scrap, which is total production less total good bottles;
4. percentage of job completed;
5. box count; and
6. estimated completion time based on current production or box inventory.

In addition to supplying on demand the shop status report and automatically periodically preparing a job status report, the console computer 17 automatically up loads data from the shop computers 15 to generate a shift report. The shift report includes the speed of each shop 11, the down time of each individual section of each shop and the quantity of good ware produced. This information is received by the supervisory computer 19 and presented to management for monitoring the condition of the IS machines in the factory and scheduling appropriate repairs.

Figure 2:
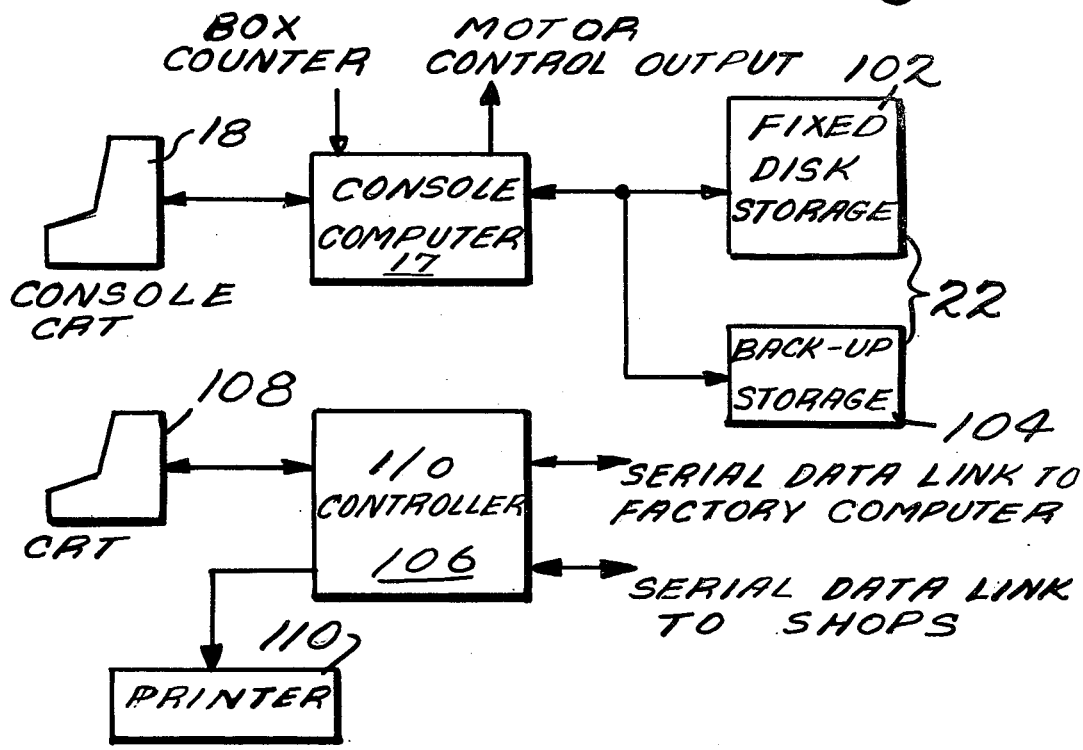
FIG. 2 is a block diagram of the console computer hardware of the preferred embodiment according to the present invention.

An exemplary hardware configuration of the console computer 17 and associated peripheral devices according to the present invention are shown in FIG. 2. The supervisory computer 19 receives inputs from the batching and raw material storage systems 27, box counters (not shown) in the warehousing and inventory systems 35 and from temperature sensors in the forehearth and furnace control systems 29. Of course, the console computer can access this information from the supervisory computer. The supervisory shop computer 15 provides motor control output to the gob distributor, shears, and conveyor systems. Also as illustrated, the console computer 17 is connected to a console CRT terminal 18 permitting console operator I/O, and to a fixed disk storage 102 and a back-up storage 104 to provide reliable storage for job history files and other information. The job history files can be created, deleted or edited by the operator through the terminal 18. A CRT display terminal 108 and a printer 20 are connected to an I/O controller 106. The I/O controller 106 is connected through a serial bi-directional data link to the factory supervisory computer 19, and by a serial bi-directional data link to the shop computers 15. The CRT display 108 is provided for I/O control, and the printer 110 is provided to supply output information in document form.

The console computer 17 comprises appropriate microprocessors and other commercially available circuitry, such as the Intel Single Board Computer (SBC) hardware series (using RMX-86 for the real time operating system). Commercially available hardware in the SBC series usable in the exemplary hardware embodiment of FIG. 2 includes:
1. SBC-660, back plane and power supply;
2. SBC-86/12, CPU;
3. SBC-064, 64K RAM;
4. SBC-464, 32K ROM;
5. SBC-544, I/O controller;
6. SBC-206, fixed disk controller;
7. two five-megabyte storage devices'
8. two color graphics CRT terminals; and
9. a TI-810 line printer.

The Shop Computers

Each shop computer 15 interfaces between the console computer 17 and the individual section computers 13 of the respective shops 11, activates the stacker control, monitors mold temperatures, stores section status information, and stores job timing information in a non-volatile storage.

As an interface unit, the shop computer 15 will respond to a message transmitted from the console computer 17 only if the message contains the appropriate pre-assigned address. Otherwise, the shop computer 15 will ignore the serial transmission until an "END" signal is detected. Once the shop computer 15 is selected, the subsequent serial transmission terminating with the END signal from the console computer 17 is stored in memory and executed in turn. If a job set-up message is received, the shop computer 15 updates the non-volatile memory of the selected section computers 13. If a section read command is received, the shop computer 15 will notify the selected section computers 13 to begin outputting information, which is buffered in the shop computer 15 for transmission to the console computer 17.

The block indicated by the reference numeral 101 in FIG. 1 represents a plurality of different kinds of monitors (sensors) that may advantageously be coupled to the shop computer 15. These sensors typically, but not exclusively, are located in the production system. For example, the present invention contemplates that a gob weighing system is included in the group of sensors 101. Certain variations in the weight of the glassware indicate certain problems with the forehearth temperature controller or the furnace temperature controller. Preferably, the shop computer 15 interfaces the gob weighing system with the console computer 17, which determines which variations are serious and notifies the furnace and forehearth control system 29 of the problem. Alternatively, the shop computer 15 determines which variations are serious and notifies the supervisory computer 19 of the problem, the console computer 17 serving as an interface. The supervisory computer 19 in turn notifies the furnace and forehearth control system 29 of the problem. Such gob weighing system is disclosed in U.S. Pat. No. 4,165,975, assigned to the common assignee herewith and is incorporated herein by reference thereto.

As an additional example, the present invention also contemplates that the sensors 101 preferably include bottle counters located along the conveyor. As described above, the supervisory computer 19 performs job scheduling and requires such information as present production rates, lehr storage capacity, quantity of finished good ware, and number of boxes in inventory to calculate the end of current jobs. Strategically placed counters extending along the conveyor system up to the packing end provide such information to the shop computer 15 which, along with the console computer 17, interfaces it to the supervisory computer 19. As aforementioned, note that the console computer 17 operates on the production rate information in addition to passing it on to the supervisory computer 19.

While the shop computer 15 interfaces the bottle gauger 97 and the sensors 101 to the console computer 17, as described above, it uses information from the sensors 101 in performing tasks assigned to it, as described below. In addition, the present invention contemplates placing most operations closely related to a shop 11, for example, overall time phasing control of all individual sections of the IS machine associated with shop 11 and shop-specific sensors, under the auspices of the shop computer 15. It is to be understood, however, that the present invention also contemplates direct connection between the console computer 17 and the shop related operations, although such an arrangement is not presently preferred.

Figure 3:
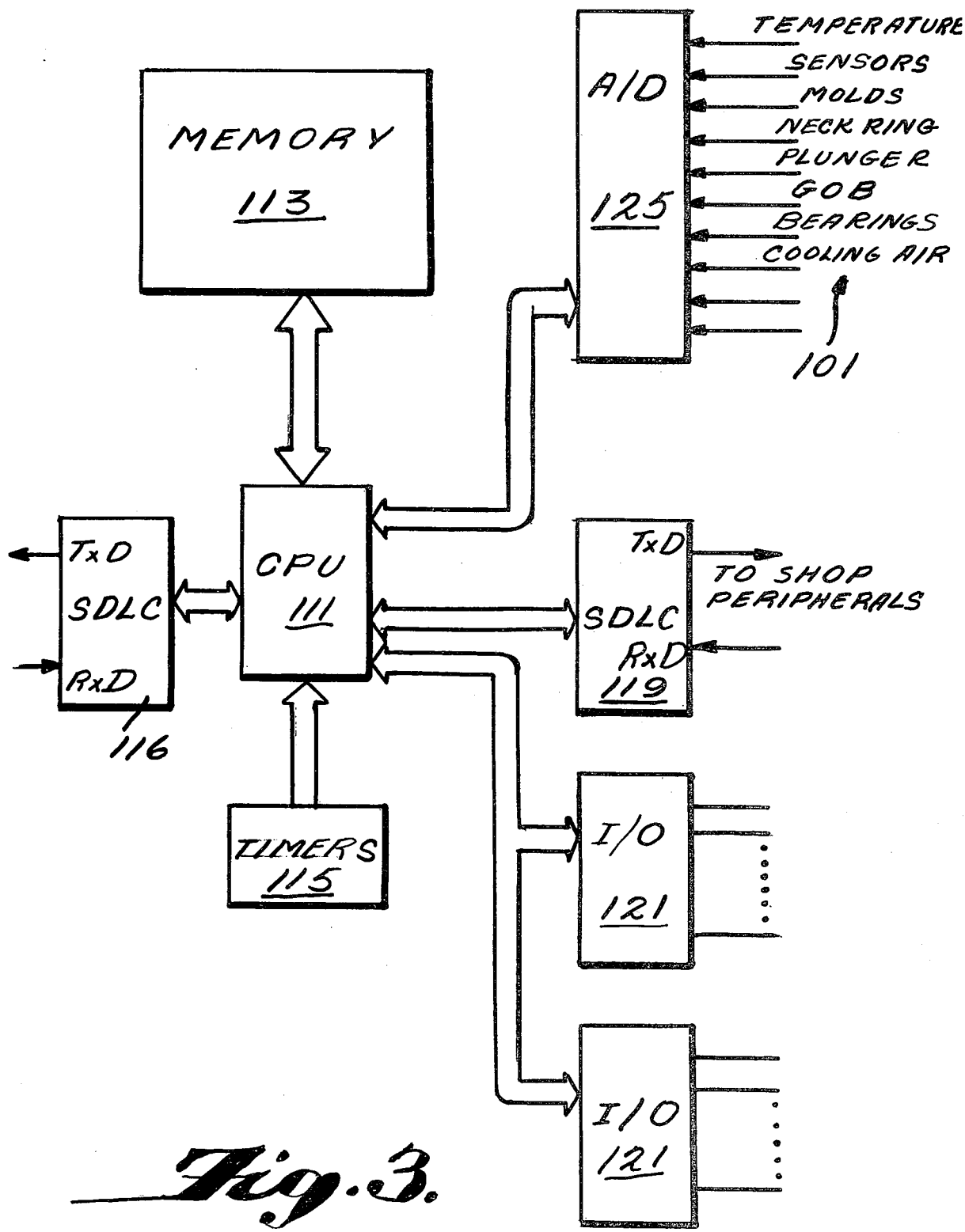
FIG. 3 is a block diagram of the shop computer hardware of the preferred embodiment according to the present invention.

With reference to FIG. 3, the shop computer 15 includes a central processing unit 111 having a memory 113 and a clock pulse generator 115 for synchronizing the operation of the computer. By an interface circuit 116, the central processing unit communicates with the console computer 17 in the aforementioned SDLC protocol. The central processing unit communicates with the individual section computers by interface circuit 119 again using the SDLC protocol. I/O unit 121 permits direct access to the computer by the shop operator by way a of keyboard. Finally, data from a plurality of sensors 101 of FIG. 1 are conveyed to the computer via an analog-to-digital converter 125.

Figure 4:
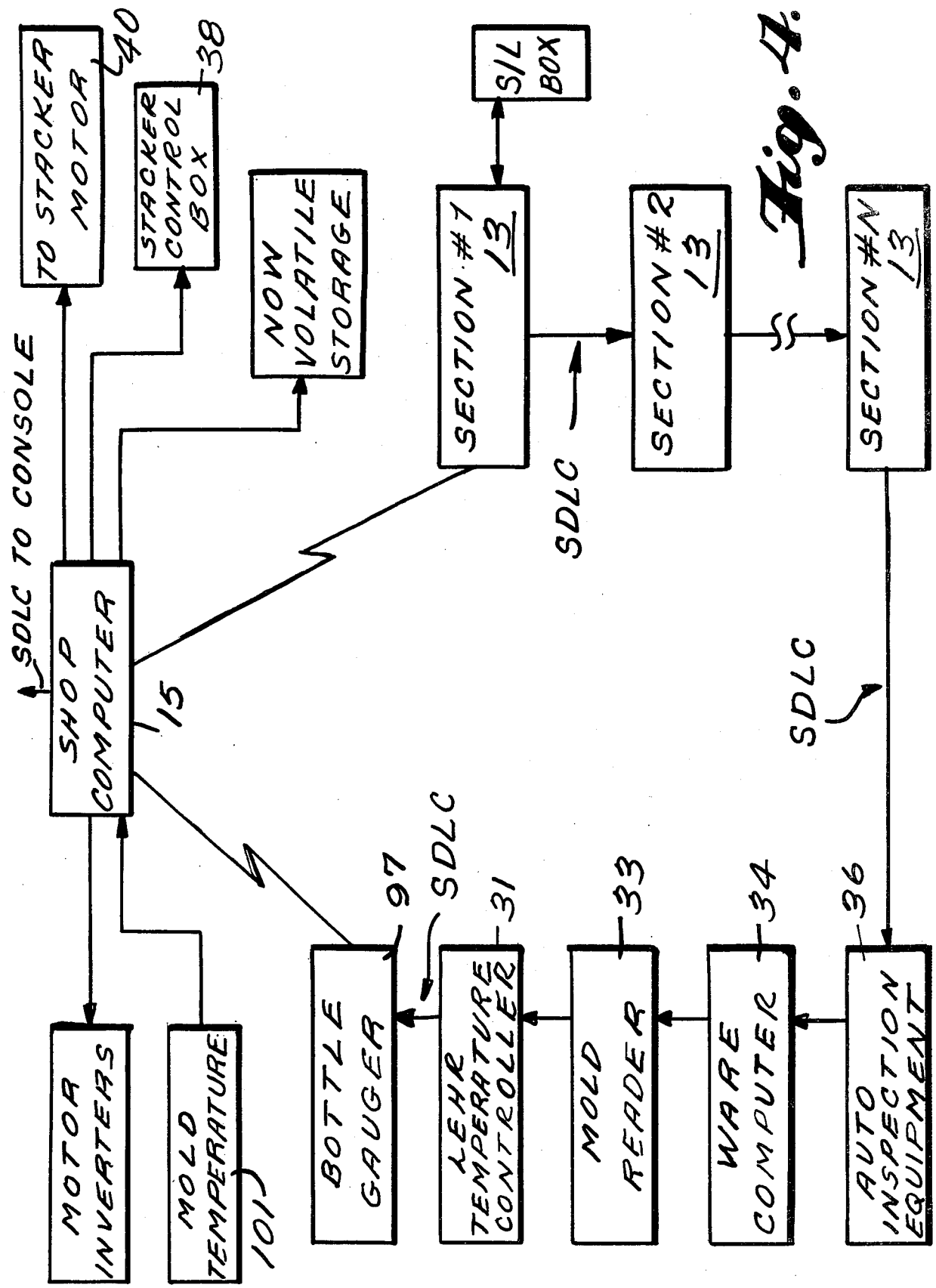
FIG. 4 is a block diagram of the shop computer network of the preferred embodiment of the present invention.

The shop computer network is illustrated in FIG. 4. As illustrated, the computer communicates with each section computer 13, the bottle gauger 97, lehr temperature controller 31, mold reader 33, ware counter 34 and inspection equipment 36 in an SDLC loop. In operation, in response to the temperature of the molds in the individual sections of the shop 11 as measured by one of the sensors 101, the shop computer 15 controls the application of cooling air to the molds to maintain them at proper operating temperature or to vary the speed of the IS machine. Such a system is disclosed in Mapes, et al., Ser. No. 281,497, the subject matter of which is incorporated herein by reference thereto.

Functioning as a stacker controller, the shop computer 15 generates all necessary timing signals in accordance with information provided automatically by the console computer 17 or manually by the shop operator through a stacker control box 38. In one mode, a stacker motor 40 is activated at a predetermined degree number. In a second mode which is a stagger mode to stack more bottles into the lehr, the stacker motor 40 is activated in one cycle at X+1 degrees, and in the subsequent cycle at X−1 degrees. The predetermined degree number can be set or modified through the terminal 18 or through the stacker control box 38 by the shop operator. To assist the shop operator in this determination a LED display indicates shear cuts per minute.

The shop computer 15 also maintains a status log for each section under its auspices. Each section log includes the number of the job currently being run, the error status, the running time (reset every 8 hours), and the down time. The computer 15 will provide this information at any time in response to a shop read command from the console computer 17.

The shop computer 15 is also able to distinguish between an initial power-up sequence and a power-up sequence after power failure. A power sensor is connected to the shop computer 15. If the shop computer 15 detects a loss of power in any of the individual sections of the shop 11, it will take certain actions. If the backup battery supply is in a discharged state, the shop computer will immediately notify the individual sections to emergency stop and transmit an error message to the console computer 17. If the backup battery supply is charged a programmed stop routine is executed for each of the individual sections by their associated section controllers. The backup battery system is disclosed in the copending application of Mapes et al, Ser. No. 281,500 filed July 8, 1981, and assigned to the common assignee herewith. Should the power failure last for one minute, for example, the shop computer 15 requests the current job timing information from each section computer 13 under its control. The timing information is received and stored in non-volatile memory. A flag in the non-volatile memory of the shop computer 15 is set, and all power is removed from the shop 11. On subsequent shop power-up, the shop computer 15 will examine the flag. If the flag is set, the shop computer 15 will automatically load the individual section computers 13 under its control with the current run program. If the flag is reset, indicating initial power-up, the shop computer 15 will request a job set-up from the console computer 17.

Figure 11:
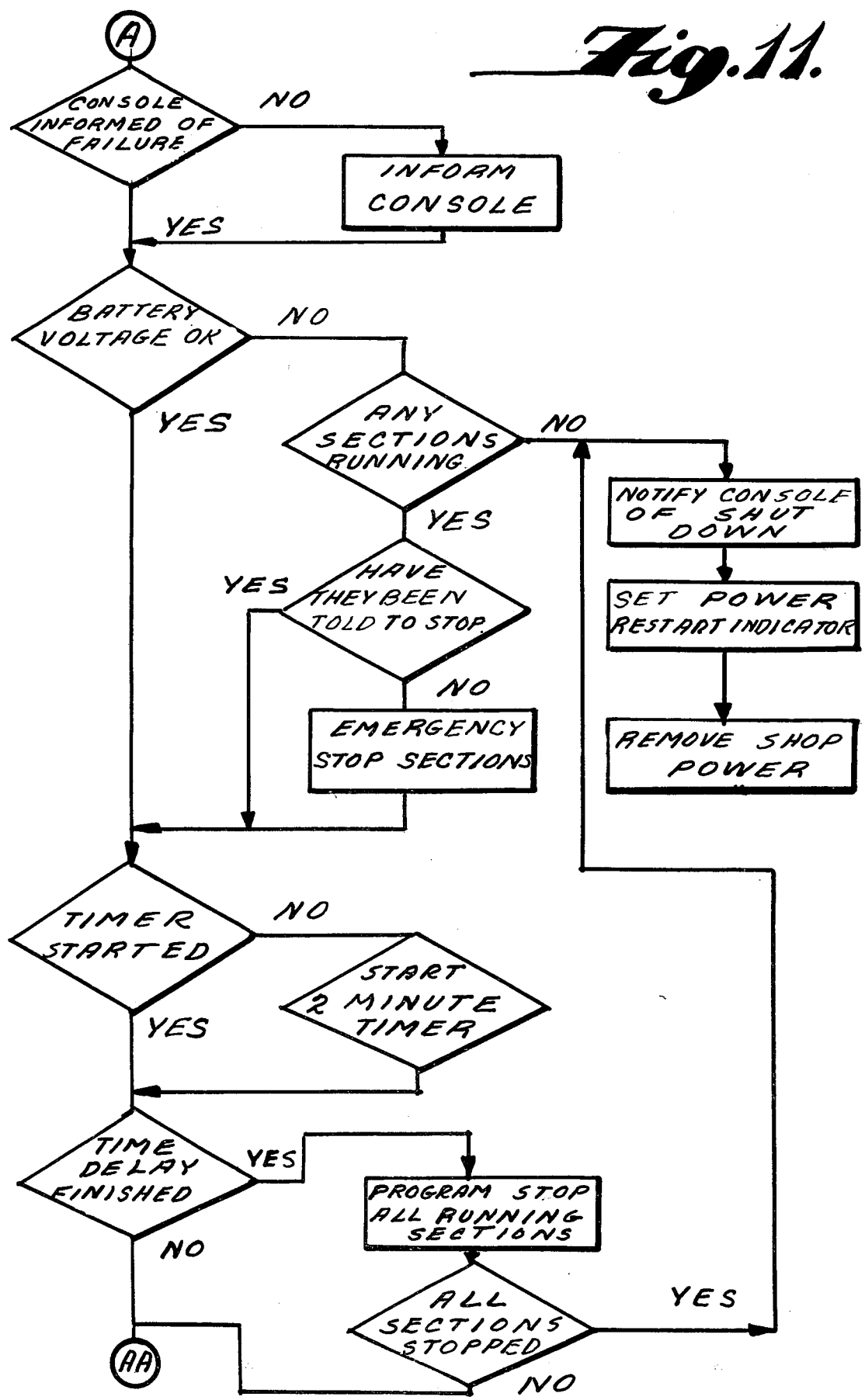
FIG. 11 is a schematic flow diagram of the battery backup system of the present invention.
Figure 12:
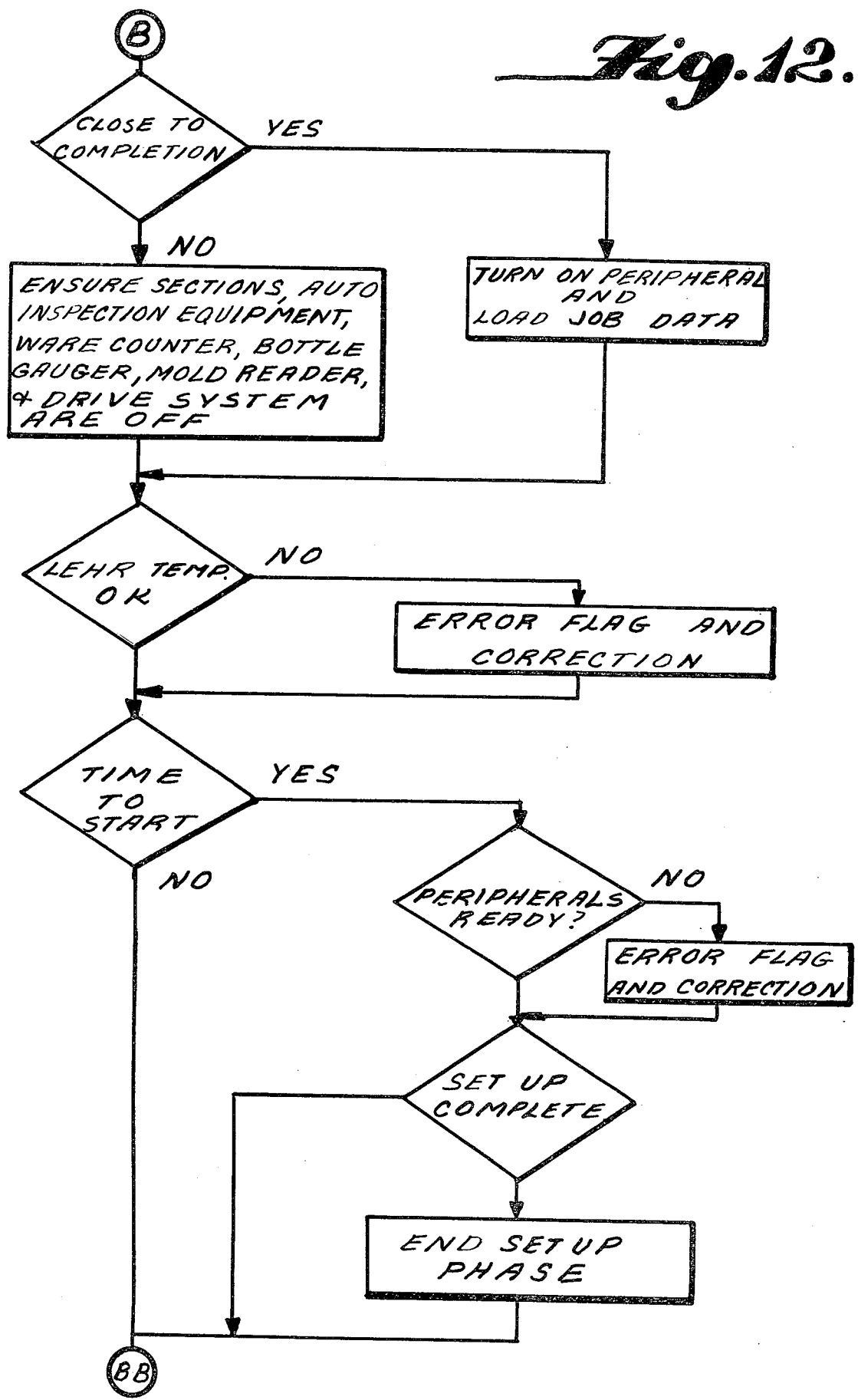
FIG. 12 is a schematic illustration of the job setup program of the present invention.
Figure 13:
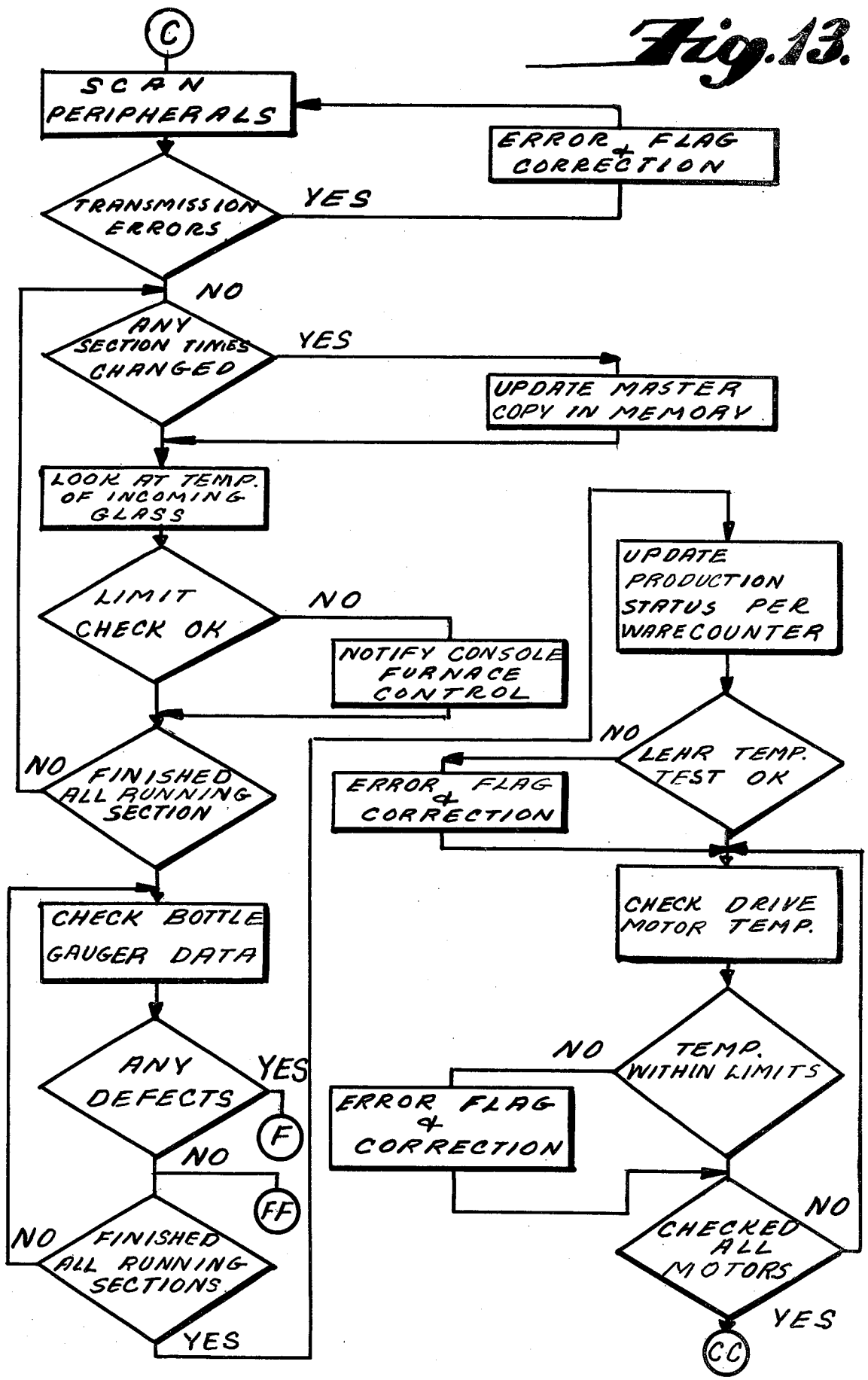
FIG. 13 and FIG. 13(a) are schematic illustrations of the peripheral scan program of the present invention.
Figure 14:
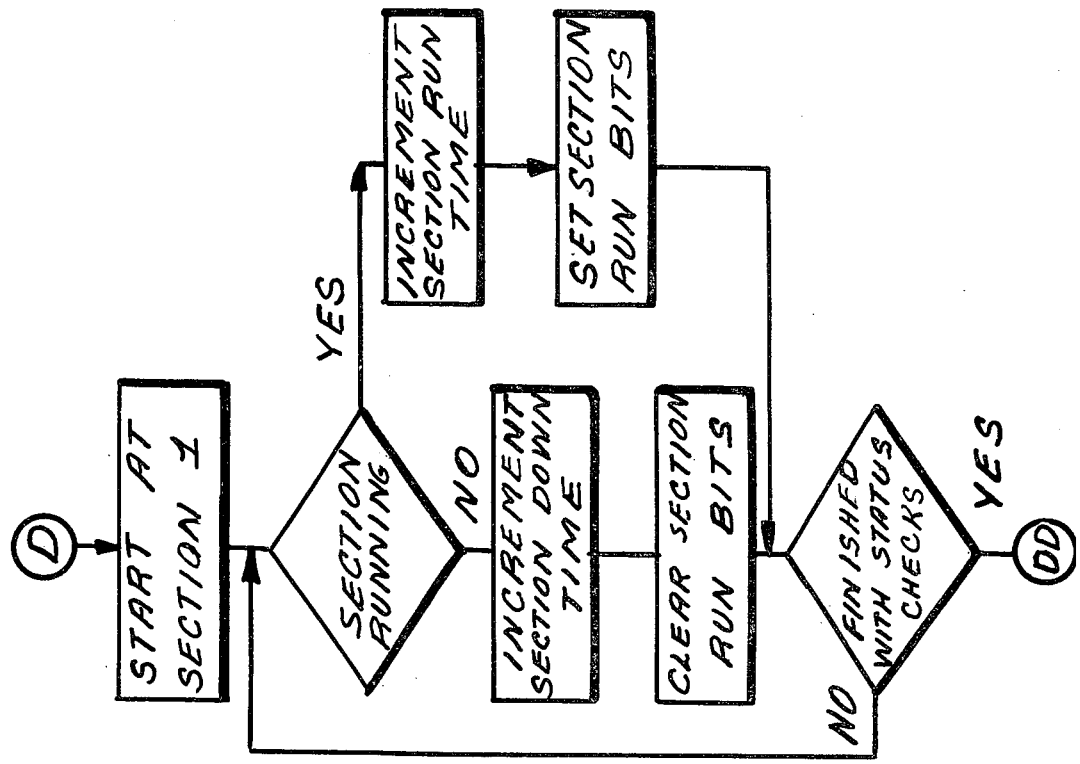
FIG. 14 is the status update program of the present invention.
Figure 13A:
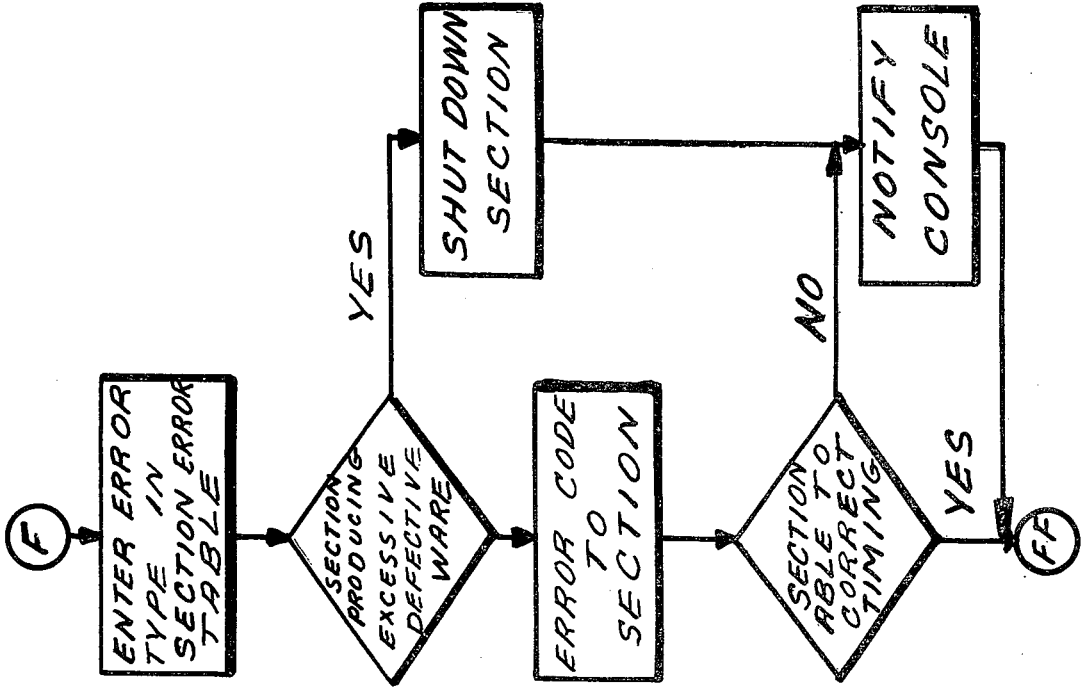
Figure 3:
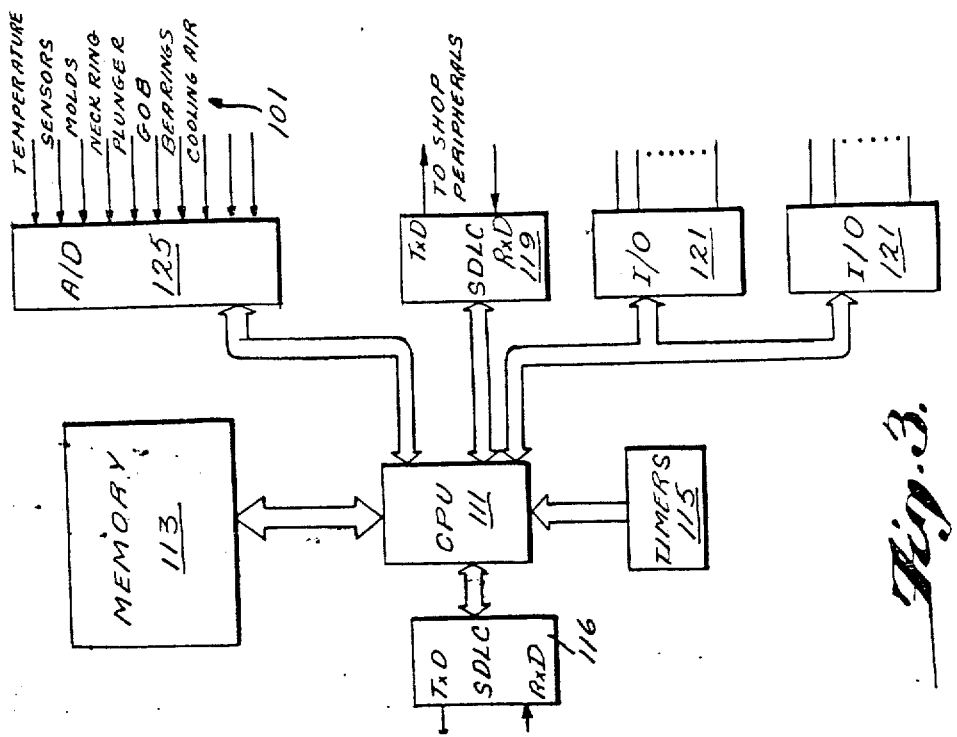
Figure 4:
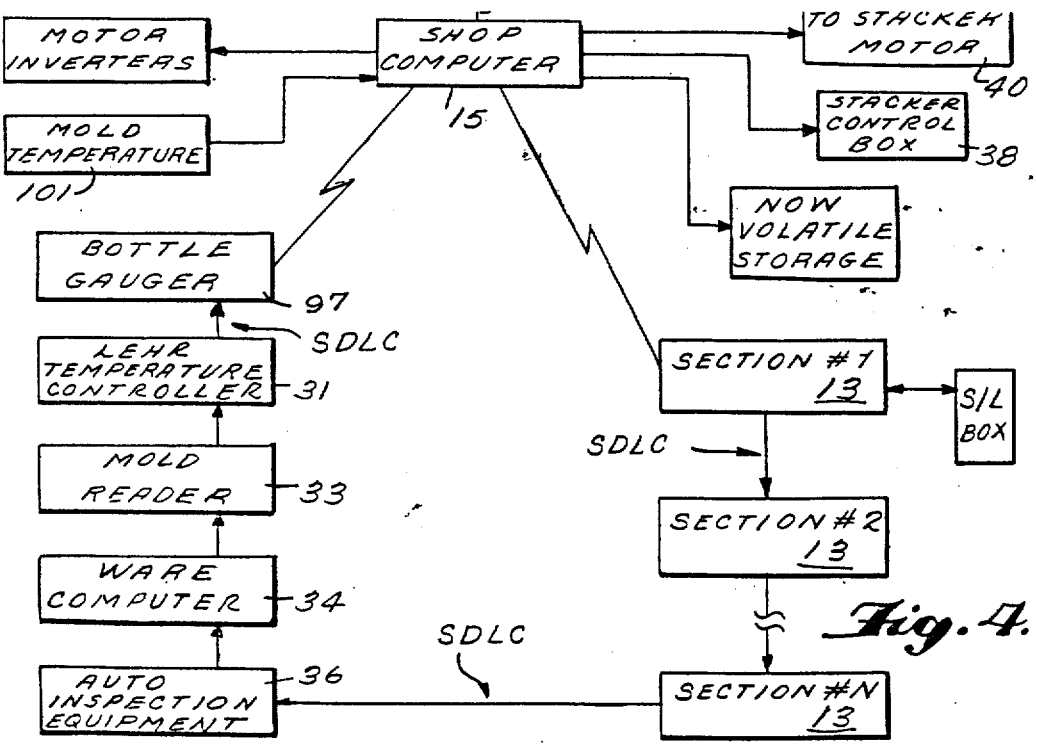
Figure 6:
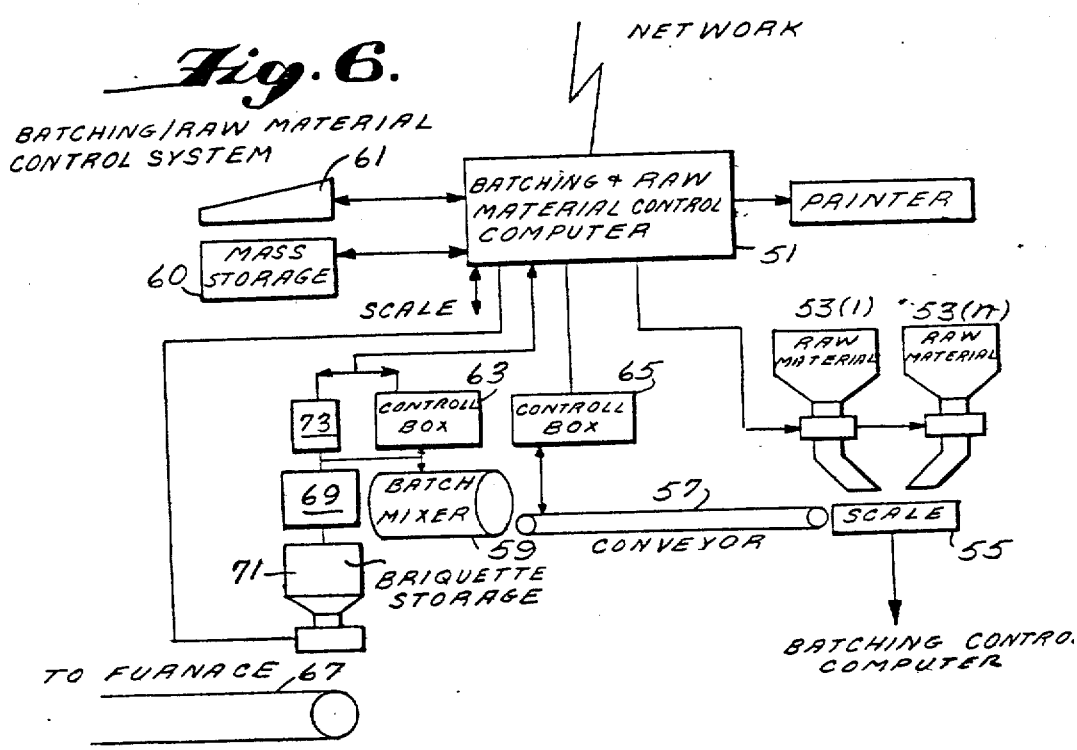

A functional flow diagram of the operation of the shop computer is presented in FIGS. 10–14. The routine illustrated in FIGS. 10–14 include the aforementioned restart from power failure feature of the present invention as well as the utilization of battery backup as illustrated in FIG. 11.

Sensor feedback, either directly or indirectly provided, is advantageously used by the shop computer 15. As an example of indirect feedback, the shop computer 15 receives signals from a "hot end gauger" associated with each shop. The hot end gauger, shown as bottle gauger 97 in FIG. 1, allows the operator to observe the ware being produced by a selected section on a graphic CRT terminal (not shown). The bottle gauger may be operated manually on site, although it is preferable for the shop computer 15 to provide automatically the necessary timing data and an operating program, thereby reducing operation intervention and opportunity for error. The shop computer 15 provides the image of a "perfect" bottle. The image detected by the bottle guager 97 is supplied to the computer 15 and compared to the image of the perfect bottle. Using a light pen to indicate points of interest, the console operator acquires the value of the average deviation of the ware at those points. In accordance with the measured deviation at the selected points and an algorithm implemented preferably by the shop computer 15, timing changes are determined and supplied by the implementing computer to the appropriate section computers 13. Such a shop bottle gauger is described in copending application of Daudt, et al., Ser. No. 281,467 which is incorporated herein by reference thereto. As an additional example, a temperature sensor (not shown) suitably located to indicate the ambient temperature in the glass forming area of the respective shops 11 facilitates correction of certain ware defects.

Direct feedback arrangements also are contemplated by the present invention to minimize the number of occasions requiring operator involvement. For example, should the automatic inspection equipment 47 indicate a sagging piece of ware, for example, an excessively hot gob or insufficiently long blow time in the finish mold is thereby indicated. Under program control, the computer 15 adjusts the blow time duration and if the problem continues adjusts gob temperature until acceptable ware is produced. Furthermore, the computer 15 adjusts the dwell period and the blow period of the individual sections in response to the sensed ambient temperature in the plant. It is well known in the glassmaking art that the ambient temperature affects the cycle time of the IS machine. Responding to predetermined stored information, the computer 15 adjusts the cycle time and other parameters in accordance with the factory or shop ambient temperature. The stored information is determined by empirical data gathered to correlate ambient with cycle operation times.

As an additional example, in the preferred exemplary embodiment the shop computer 15 is coupled to automatic inspection equipment 47, as aforementioned. Inputs from the inspection equipment 47 are advantageously used to correct ware defects associated with individual section function timing and forehearth temperature. In making such timing and temperature corrections, the computer 15 must account for the instantaneous storage capacity of the lehr. The lehr storage capacity is determined by the shop computer 15 in accordance with the production rate of the glass machine as measured by the sensors 101 of FIG. 1 and the predetermined values of lehr conveyor speed, lehr capacity and ware size.

Although not shown in FIG. 1, the shop computer 15 is connected to the gob distributor, shear, and conveyor drives and to the section computer 13 by control lines. The description of this arrangement is set forth below after the shop computer 15 and the section computers 13 are described in detail. The relationship between the control signals provided to the drives and to the section computers 13 by the shop computer 15 will be better understood at that point.

The Section Computers

Each section computer 13 provides timing signals for controlling the glassware forming mechanism of the associated individual section. As described above, the section computer 13 receives a set-up message from the console computer 17 through the shop computer 15 acting as an interface. The shop operator retains substantial control over the glassware forming mechanism of each individual section, however, through a "sooner/later box" (hereinafter "S/L box") indicated by reference numeral 50 in FIG. 5. The S/L box enables the shop operator to vary the function degree settings; start, stop, or emergency stop the section; and vary the firing order degrees of the section. The operator is able to view the function and firing order degree settings with a LED display. It should be understood, however, that the console computer 17 has ultimate control of the glassware forming mechanism of each individual section as is apparent from the following list of override commands available from the console computer 17 to the section computer 13 through the shop computer 15 acting as an interface:

1. program stop individual sections;
2. hold a section stop, ignoring the operator-controlled start button on the section;
3. release a stop section;
4. change a function degree and firing order, i.e., if the section is stopped, the new degree settings are established.
5. transfer current degree settings to the console computer 17; and
6. assign drivers to IS machine functions.

Figure 5:
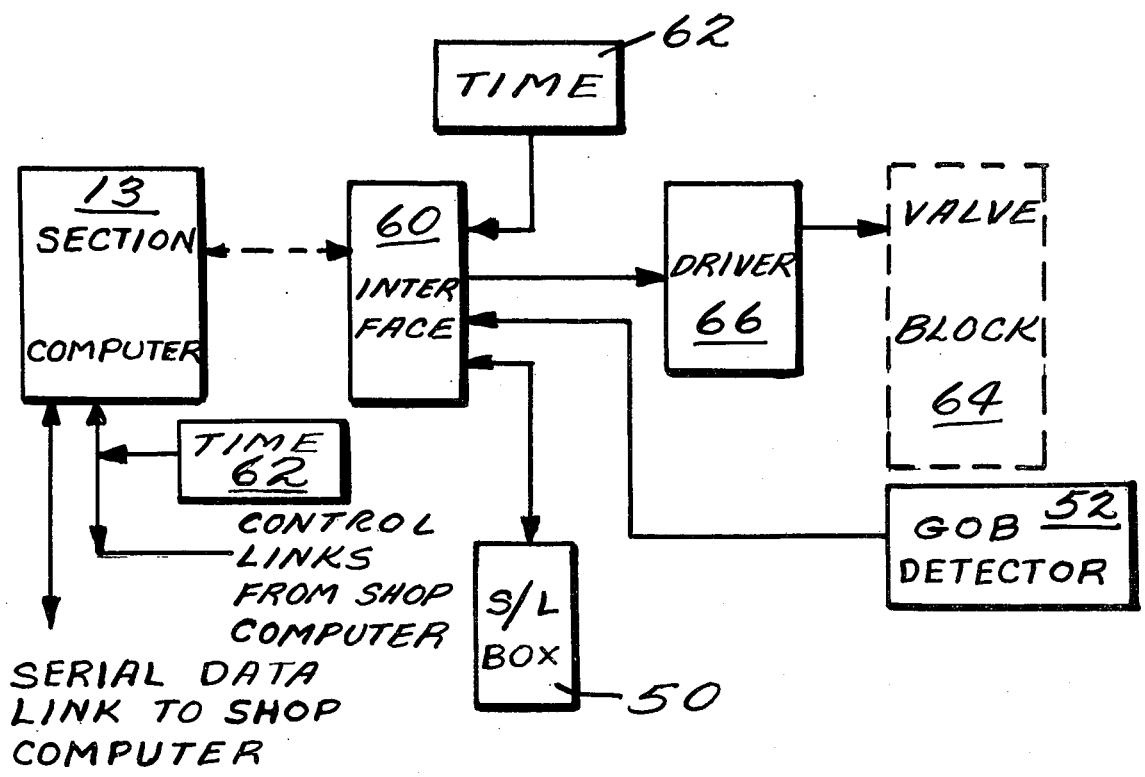
FIG. 5 is a block diagram of section computer hardware of the preferred embodiment according to the present invention.

Aside from controlling the timing of the glassware forming mechanism of the associated individual section, the section computer 13 monitors the output of a gob detector indicated by reference number 52 in FIG. 5. The gob detector 52 is a photocell which generates a signal indicating when the gob is properly deposited in the mold. If the detector 52 does not generate the proper signal when a gob should be deposited, improper seating is indicated. The section computer 13 then automatically initiates a program stop sequence which inhibits the next gob, clears the remaining glass from the section, and stops the section. The shop computer 15 is notified of the stoppage and its cause for updating the section status information.

The section computer 13 additionally adjusts the pressures supplied to various operating valves by the valve block. The adjustments are performed in accordance with the selected job under automatic command of the console computer 17, shop computer 15 performing as an interface, or by the console or shop operators through the console computer 17 or shop computer 15, respectively.

The section computer 13 is responsive to commands originating from the shop computer 14, such as:

1. program stop (loss of power);
2. transfer degree settings to the shop computer 15; and
3. transmit section status to the shop computer 15.

An exemplary hardware embodiment of the section computer 13 and its associated peripheral devices is shown in FIG. 5. An interface 60 buffers the computer 13 from the section hardware, which includes a sooner/later ("S/L") box 50, a timing device 62, and a gob detector 52. The S/L box 50 may be used by the section operator to perform machine start and stop commands and to vary the function degree settings and section firing order degrees. A LED display on the S/L box 50 allows the operator to view the degree settings. Timing for the section computer 13 is provided by the timing device 62. A gob detector 52 monitors positioning of the gob in the mold. If the gob is improperly received, the section computer 13 initiates the program stop sequence described above. The section computer 13 operates the glassware forming mechanism by providing control signals to the valve block 64 through a driver 66. The section computer 13 is connected to the shop computer 15 by a serial bi-directional data link and a control line.

The section computer 13 comprises a central processing unit, a ROM program memory, a RAM data memory, and I/O devices. Any suitable commercially available microcomputer, such as the Intel SBC-80/05, may be used to provide the functions of the section computer 13. The driver 66 is well known in the art and is provided to achieve the necessary single levels to activate the solenoid valves of the valve block.

The Batching System

Figure 6:
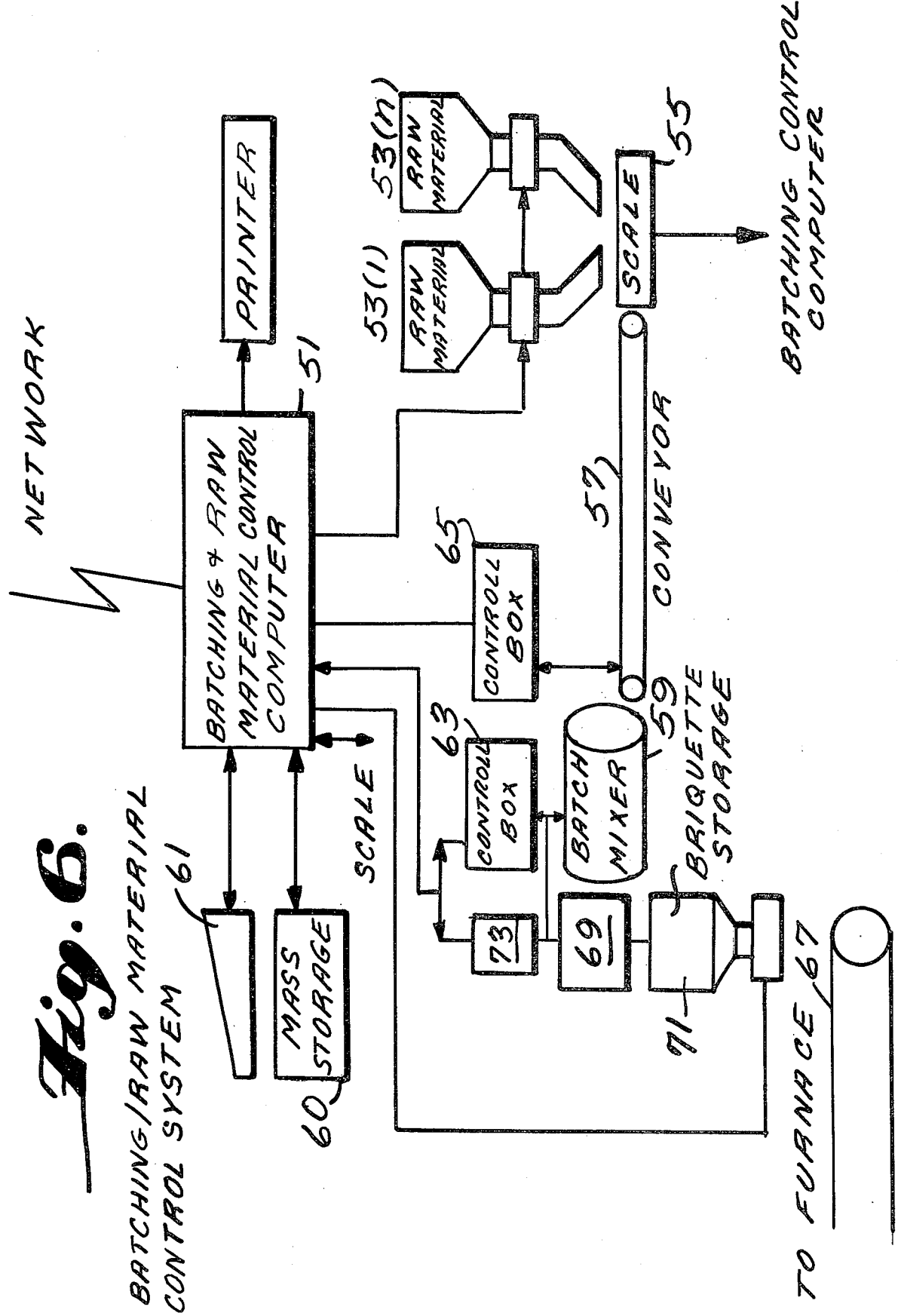
FIG. 6 is a block diagram of the batching and raw material storage control system of the present invention.

Refer now to FIG. 6 where there is disclosed the batching system of the present invention. One operation controlled by the supervisory computer is the batching system 27 which is disclosed in greater detail in FIG. 6. This system includes a microprocessor 51 which receives information including data and instructions from computer 19 by the SDLC or HDLC system aforementioned. A number of storage hoppers 53(n) are shown in which are stored the ingredients for forming glassware. The major ingredients include sand ($SiO_2$), soda ash, limestone, and feldspar. In order to control color as well as the bubbles in the containers, ingredients such as carbon, barium, sodium and commonly known decolorizers are added in small amounts. As contemplated by the present invention, the major ingredients, i.e., sand, soda ash, etc., are stored in the hoppers 53 and are fed in measured quantities to a conveyor system. Thus, these materials are discharged onto a scale 55 by means of an auger system or gravity and measured for weight. After a predetermined quantity of material is conveyed to the scale and measured, the material is moved by a conveyor 57 and delivered to a rotating batch mixer 59. Other materials are discharged from another hopper, weighed and transported to the mixer 59. This continues until all the major ingredients have been supplied in the predetermined quantity as instructed by the computer 51. The specific mix will depend upon the type of glass to be made and this information is ordinarily stored in the mass storage system 60. It should be appreciated, however, that the relative quantities of each material forming the batch can be varied by an operator by an appropriate input keyboard 61. In this connection, it should also be appreciated that the operation of the rotating mixer 59 and conveyor 57 can be manually controlled and the computer instructions overridden by switches in the control boxes 63 and 65, respectively. In either case, a sensor measures the moisture content of the batch and in response the controller causes a determined amount of water to be added. In the alternative an operator can add water in a desired amount to the mix and adds the minor color and bubble control materials by hand.

In one embodiment, the output of the mixer 59 is conveyed directly to the furnace (not shown) by furnace conveyor 67. However, in the preferred embodiment, the output of the mixer 59 is conveyed to a briquetter 69. Briquetters are known in the art and form briquettes by compacting and then cooling the mix. The briquettes thus formed are stored in hopper 71. As raw material for the furnace is required, the hopper is opened under control of computer 51 and briquettes are discharged onto the conveyor 67 either by an auger system or by gravity. It should be appreciated that the control of the briquettes can be manually overridden by an appropriate switch mechanism in the briquette control box 73.

Summarizing the operation of the batching system, a predetermined inventory of raw materials is maintained as determined by the computer system. At predetermined times, the computer initiates the formation of briquettes by automatically weighing and discharging predetermined amounts of the raw materials onto a conveyor. The raw materials are conveyed to the mixer where a measured amount of water is added to the mixer. The processor 51 also controls the mix time for the raw materials in the mixer. Finally, the mix is conveyed to a briquetter where briquettes of glass are formed for later use in the furnace. If a briquetting process is not being used, the mix is directly conveyed into the furnace. The aforementioned process is controlled in accordance with a software package which is not disclosed herein in greater detail because such can be readily developed without undue experimentation.

The Furance and Forehearth

The furnace and forehearth 29 are illustrated only schematically in FIG. 1 because they are wellknown in the art. The anticipated pull rate of the glassware forming system is easily discernible by determining the number of gobs of glass being formed per unit of time in the factory and the weight thereof. The weight of a gob of glass can be determined by measuring the weight of a gob as it is conveyed to the blank mold of the IS machine or by weighing the glass containers formed by the gobs of molten glass. A system for measuring the weight of gobs of glass is disclosed in the U.S. patent issued to Wood and assigned to the common assignee herewith.

The values for gob weight and number of gobs formed per unit of time are determined by the respective shop computers 15 and transmitted to the console computer 17. Knowing the pull rate from the forehearth, the batching control computer then determines the quantity of briquettes required and the rate of feed of such briquettes to the furnace. The controller for the furnace maintains temperature control by techniques known in the art.

Lehr Temperature Controller

Figure 7:
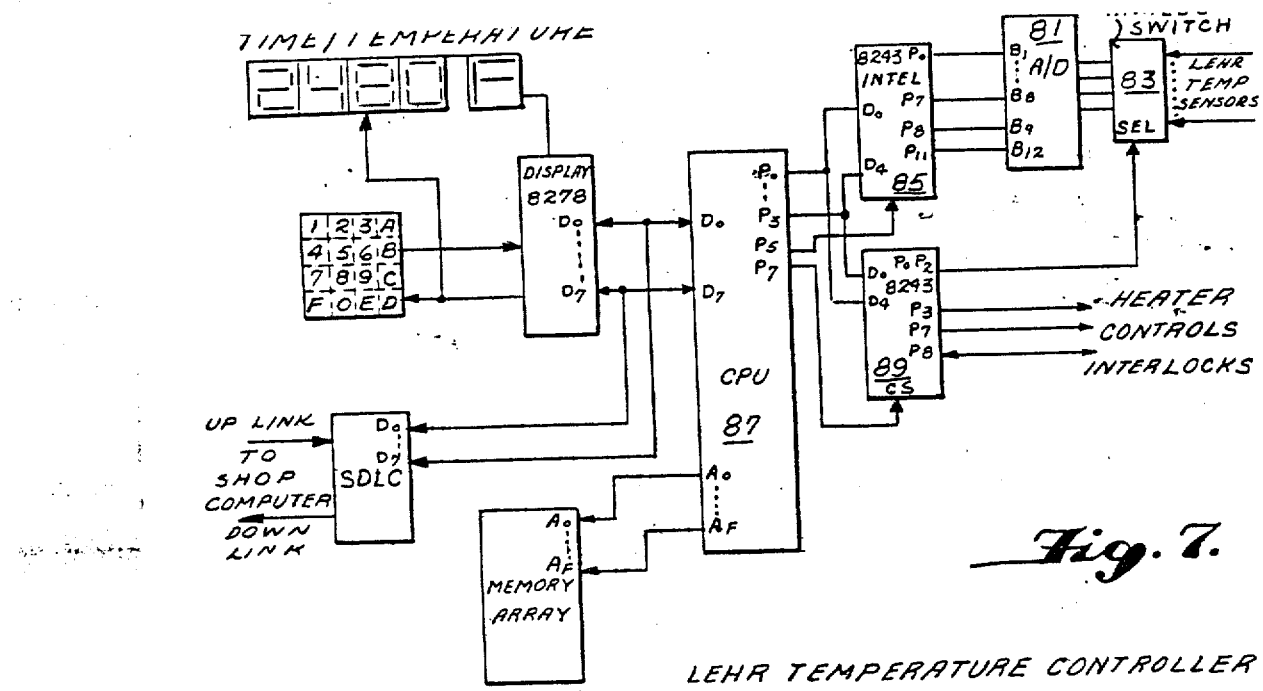
FIG. 7 is a block diagram of the lehr controller of the present invention.

Refer now to FIG. 7 which is a simplified schematic illustration of the lehr temperature controller 31. The lehr temperature controller maintains the temperature gradient in the lehr by cycling the heaters therein on and off or, if required, by opening vents to admit cooling ambient air to the lehr. The lehr permits the fast dumping of heat by turning off all heaters and opening all cooling vents where such action is necessary. This permits rapid cooling of the lehr.

The lehr temperature controller provides by an SDLC protocol, the current lehr temperature and establishes a desired lehr temperature. The lehr controller also provides the information relating to the time necessary to bring the lehr up to the desired temperature level, the average energy consumption for the lehr at various temperature levels and the status of the lehr.

Analog temperature of the lehr is detected along the length thereof by a plurality of temperature sensors. The output of the temperature sensors is sequentially fed to an analog-to-digital converter 81 by means of an analog switch 83. The analog switch sequentially couples the analog temperature signals from the sensors to the analog-to-digital converter 81. These analog temperature signals are converted to BCD digital signals by converter 81. These signals are encoded by encoder 85 and coupled to the microprocessor 87. A second encoder 89 receives a digital signal from the interlocks in the lehr to determine whether the lehr should be shut down.

Ware Counter

Figure 9:
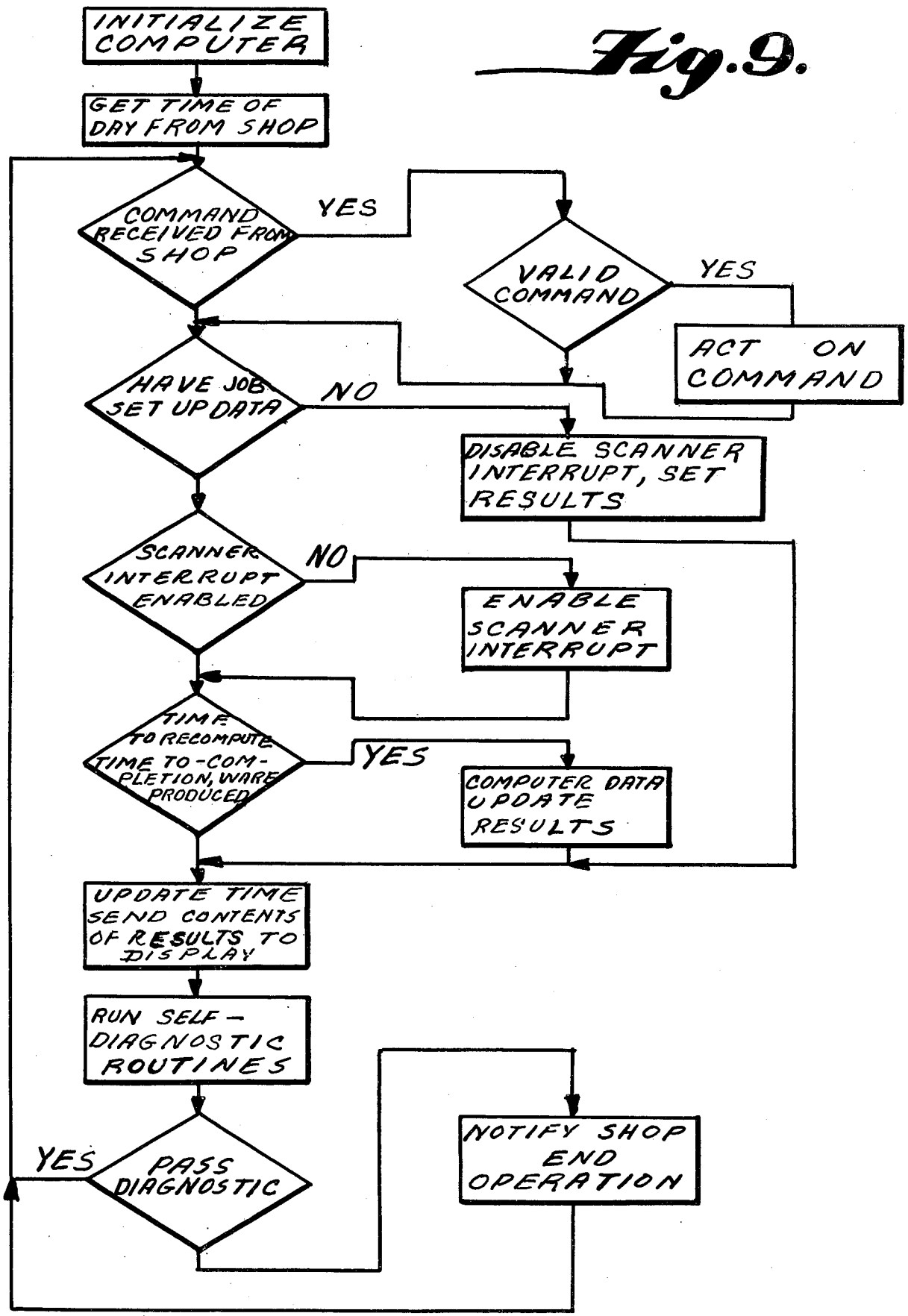
FIG. 9 is a schematic flow diagram of the program for the ware counter of FIG. 8.
Figure 10:
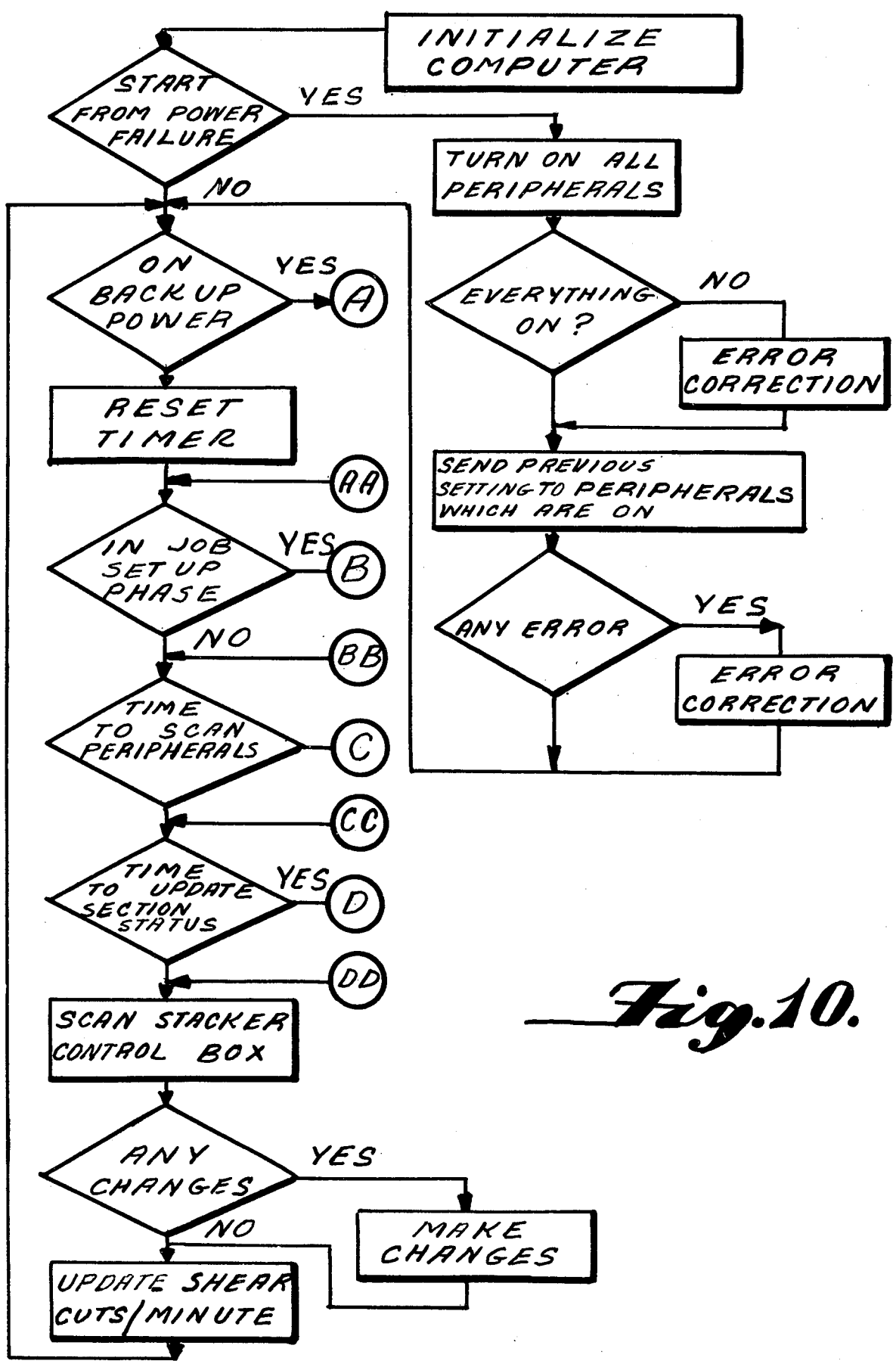
FIG. 10 is a schematic flow diagram of the shop computer program of the present invention.
Figure 8:
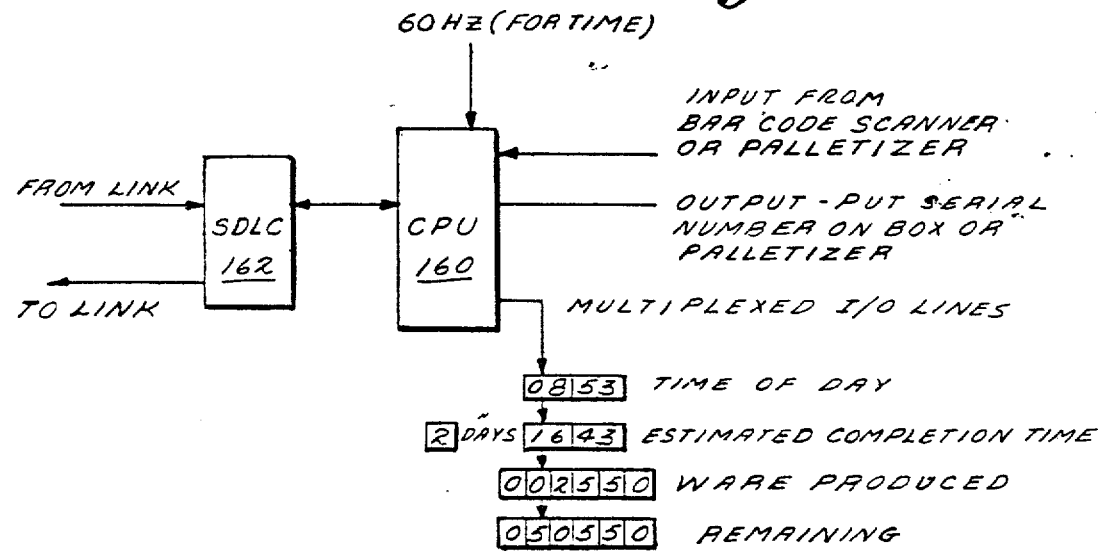
FIG. 8 is a block diagram of the ware counter of the present invention.
Figure 9:
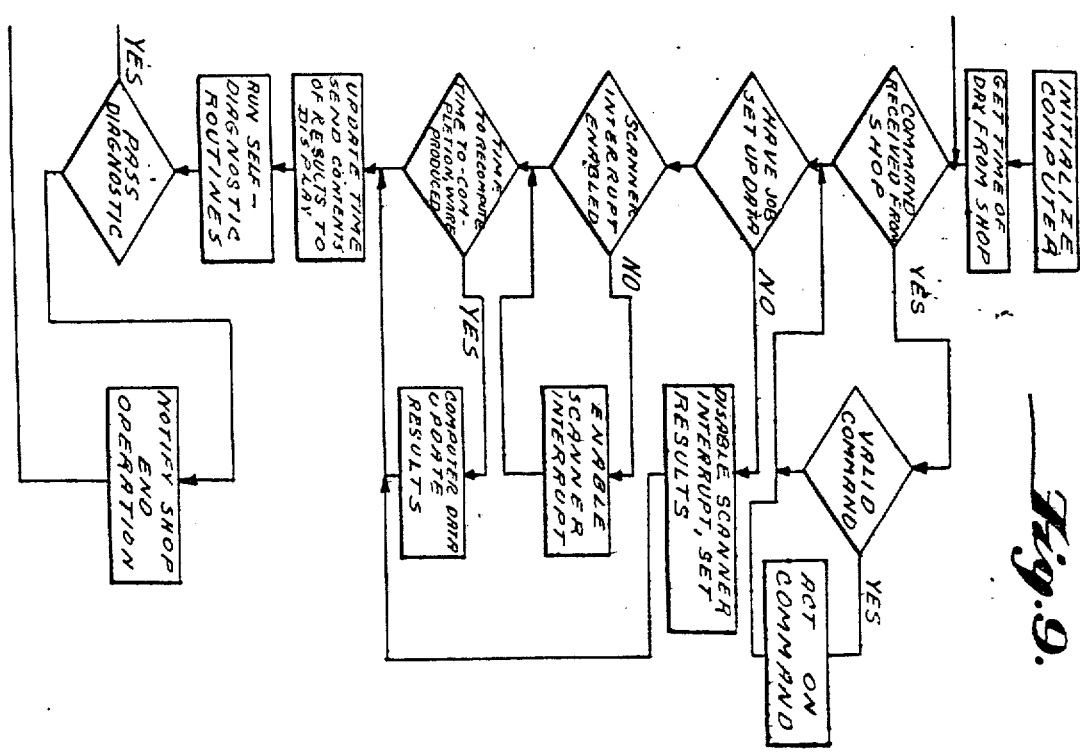
Figure 10:
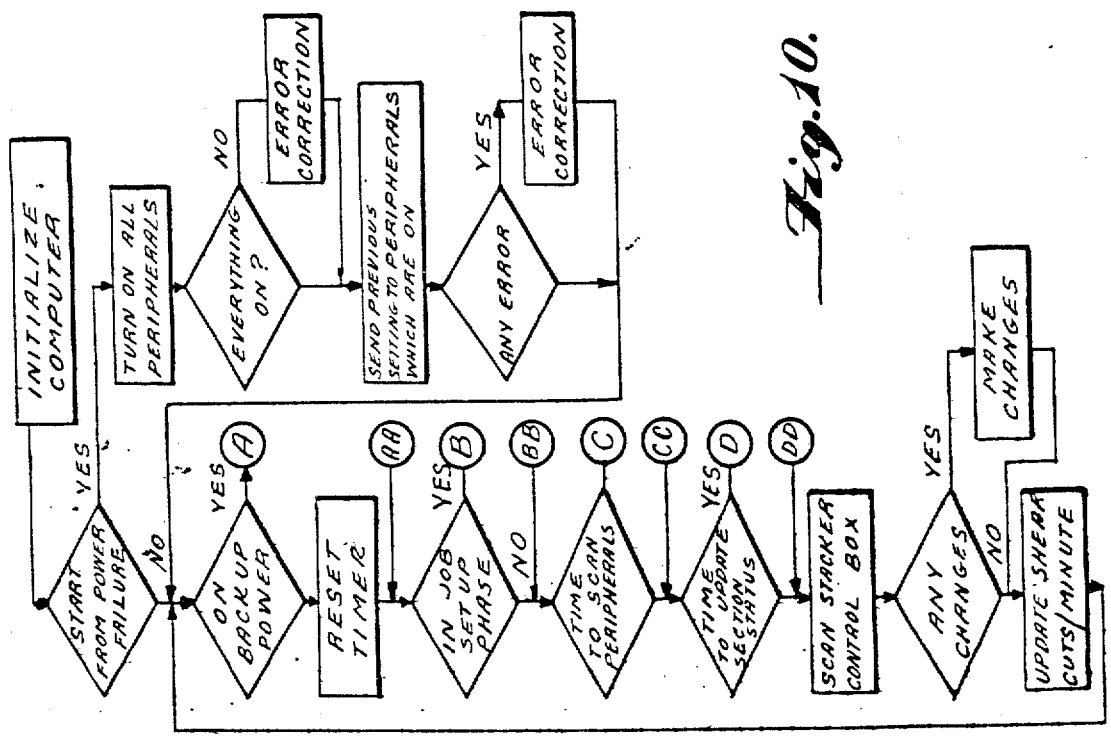
Figure 11:
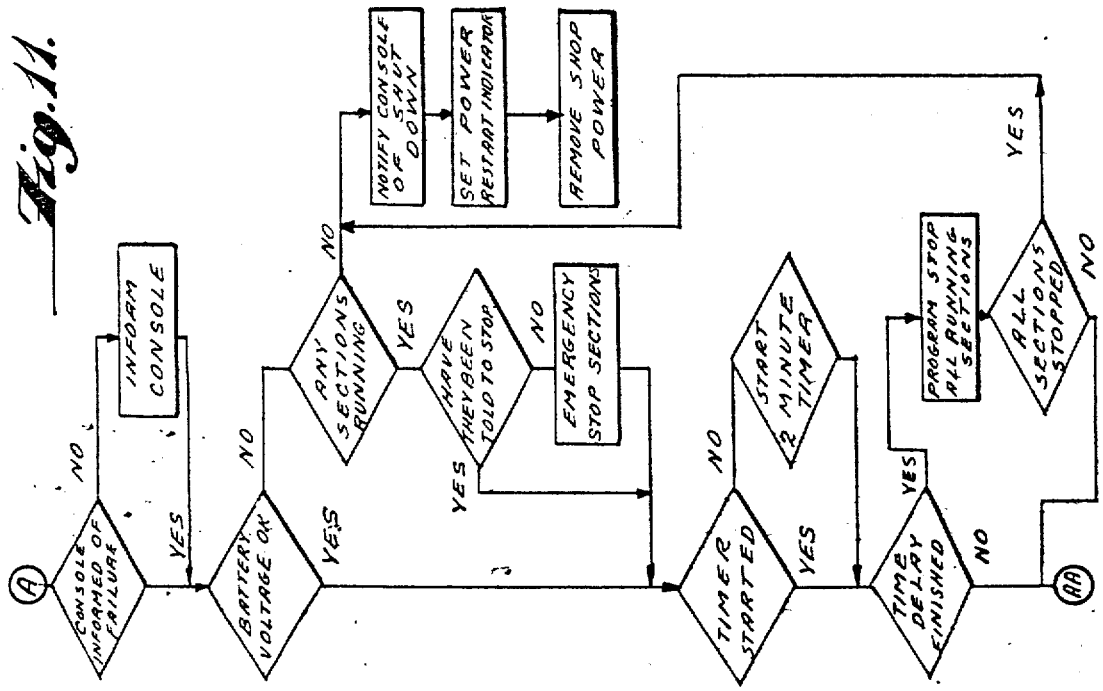
Figure 13:
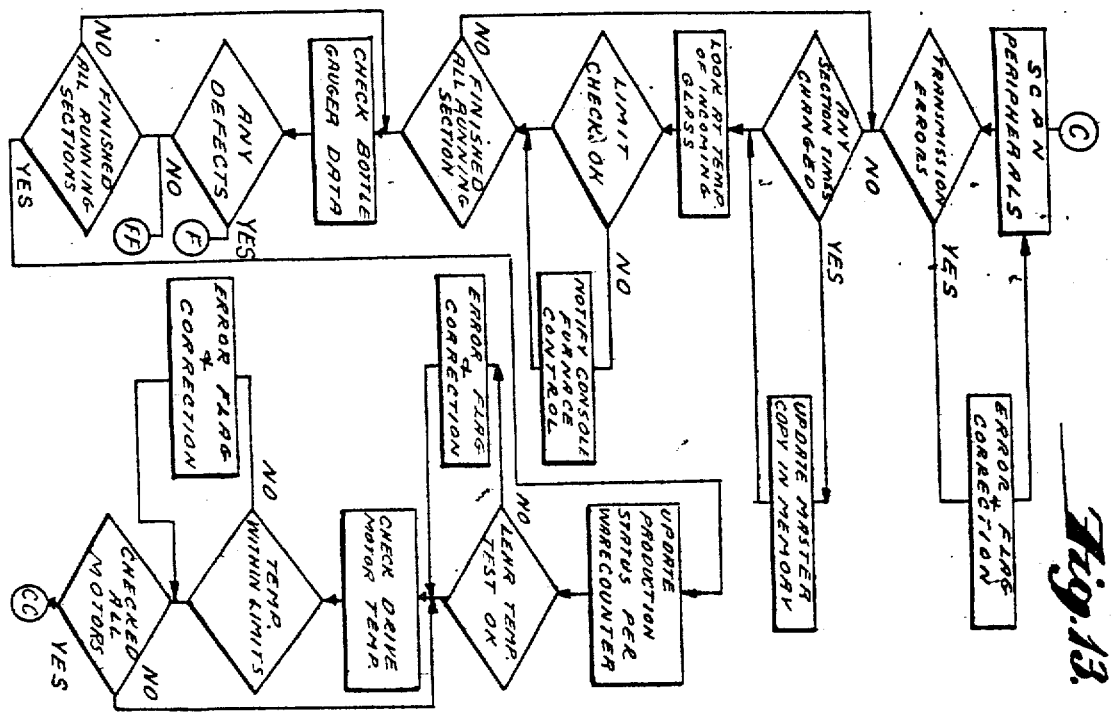
Figure 13A:
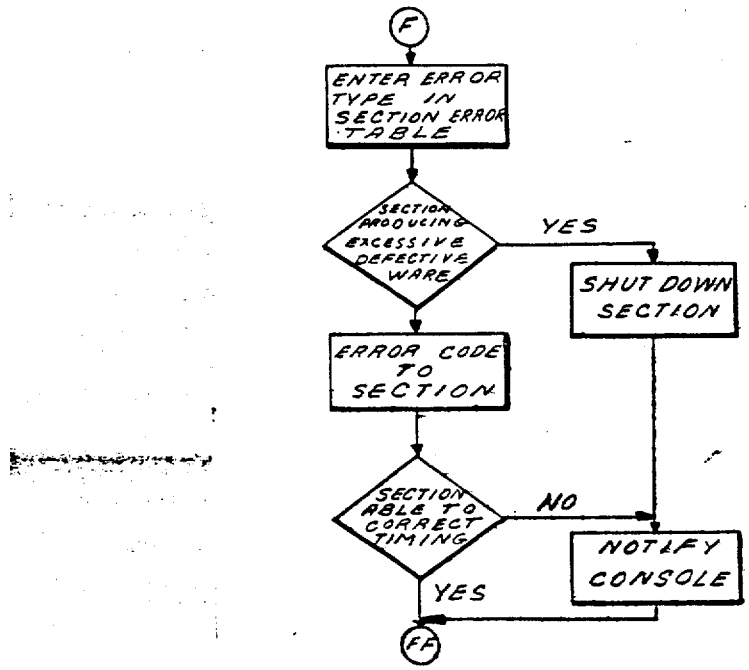
Figure 14:
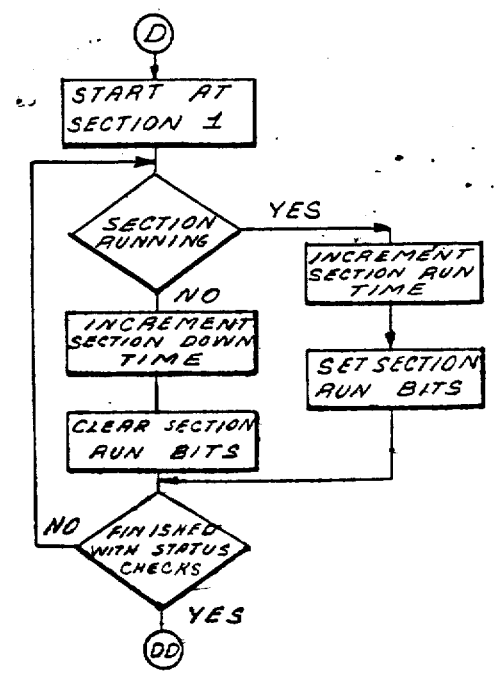

Refer now to FIGS. 8 and 9 which illustrate the ware counter hardware and flow diagram of the process of ware counting, respectively. The ware counter serves the purpose of counting the number of packed boxes or containers in any given job run. This information is used to compute the estimated time required to complete a given job. This computation is based upon a current production rate, the number of boxes of containers (or containers) produced and the number of boxes (or containers) required to be produced. Thus, the ware counter provides at any time of day, the estimated time required to complete the job, the number of containers produced, and the number to be produced. This information is conveyed from the ware counter's microprocessor 160 to the shop computer 15 during the SDLC protocol via buffer 162. This information is, also, displayed visually at the counter. The operating program for the ware counter is illustrated in FIG. 9.

It should be noted that it may be important to identify the date bottles were made and the type thereof. The ware counter can easily perform this task by printing on labels at the I/O of the computer 160 the date, serial number and relevant data. The label is then manually placed on each box as it is filled. This process will ensure constant rotation of stock being warehoused.

Optimum Length of a Gob Run

In keeping with the invention, by maintaining an account of the containers manufactured by the warehousing and inventory system, the most economic length of a job run can be determined. As a general rule, a machine that forms a relatively large number of containers of the same type operates more efficiently than one that forms only a small number. However, the large number of containers must be stored and, accordingly, the storage costs and inventory expenses increase with the increased quantity of stored containers and the increased time of storage. The balancing factors are that once a job is initiated, and each of the sections of a machine are properly timed, very few defective containers are produced and, accordingly, the machine is operating at a high efficiency. This is in contrast to the machine start-up period during which the molds are being brought up to temperature and the timing of the various functions of the IS machine is not properly adjusted. During this period, defective containers are produced which, of course, must be discarded. Thus the IS machine itself operates at maximum efficiency when manufacturing containers in a lengthy job run. However, if these containers must be inventoried and stored, the inventory costs cut into the savings brought about by the efficiency of the long run. It is the task of the supervisory computer 19 to determine what length the run is optimum for any given job and to schedule the length of the job accordingly. The maximum or optimum length of run is determined by determining how long a run is required before the average net income per day reaches a maximum level. In order to do this the following equation must be solved:

Ave. Net Income/Day=(Net Income/Gross×Total Gross Packed)/No. of Days Run

Where Net Income/Gross is the net income per gross of containers packed, this figure is computed by determining the Net Sales/Gross which is the sales price for gross minus the freight and discount costs. From the net sales per gross, the marginal income per gross is computed by subtracting from the net sales per gross the variable costs per gross. Variable costs include cost of raw materials, labor and other non-fixed manufacturing costs. Having computed the marginal gross income, the income per gross is then computed by subtracting from the marginal income per gross fixed manufacturing costs, mold equipment costs, machine repair costs, research and development costs and selling costs. Having computed the income per gross, the net income is then computed by subtracting the income per gross from the inventory carrying costs which costs include the warehousing costs and interest charges relating to the product being stored. For any given day the average net income per day is computed by the factory supervisory computer to determine when the optimum economic length of run is. Below is a chart which illustrates the aforementioned computations in relative terms.

| Day | GLASS PLANT ECONOMIC LENGTH OF RUN | | | | | |
|---|---|---|---|---|---|---|
| | Efficiency % | Accumulated Gross-Pack | Fixed Cost/Gross | Inventory Carrying Cost | Net Income/Gross | Average Net Income/Day |
| 1 | 60.9 | 808 | 9.530 | 0.000 | −1.934 | −1,562 |
| 2 | 69.5 | 1,845 | 8.347 | 0.000 | −0.751 | −693 |
| 3 | 72.5 | 2,886 | 8.004 | 0.000 | −0.408 | −392 |
| 4 | 74.1 | 3,933 | 7.831 | 0.000 | −0.235 | −231 |
| 5 | 75.1 | 4,983 | 7.726 | 0.000 | −0.130 | −129 |
| 6 | 75.8 | 6,035 | 7.655 | 0.001 | −0.060 | −60 |
| 7 | 76.3 | 7,088 | 7.604 | 0.027 | −0.035 | −35 |
| 8 | 76.7 | 8,142 | 7.566 | 0.046 | −0.016 | −16 |
| 9 | 77.0 | 9,196 | 7.536 | 0.060 | 0.000 | 0 |
| 10 | 77.3 | 10,258 | 7.506 | 0.072 | 0.018 | 18 |
| 11 | 77.5 | 11,313 | 7.487 | 0.086 | 0.023 | 24 |
| 12 | 77.7 | 12,373 | 7.468 | 0.109 | 0.019 | 20 |
| 13 | 77.8 | 13,421 | 7.458 | 0.127 | 0.011 | 11 |

From the chart it can be seen that machine efficiency gradually increases from day to day. In addition, the fixed costs tend to decrease as the length of the run increases. However, inventory costs increase and, accordingly, the net income per gross first increases until the 11th day after which the increased inventory costs tend to reduce the profit margin. Thus, the average net income per day peaks after 11 days and, accordingly, 11 days is the most economic or optimum length of run. It should be appreciated that the most economic length of run was computed using a time period of one day. This could be changed to a period which equals the shift length or some other period. Having calculated the economic length of run, the factory supervisory computer then controls the associated shop computer via the console computer 17 so that it operates on a given job for only the economic length of run after which a new job is initiated.

While the aforementioned invention has been described in connection with the preferred embodiment thereof it should be understood that other embodiments of the invention may be utilized which fall within the spirit and scope of the invention as defined by the appended claims.

Throughout the above description of the present invention the term serial bi-directional data transmission is exclusively used, however, as will be appreciated by those skilled in the art, parallel bi-directional data transmission may be readily adapted to the present invention depending on the specific hardware used and desired operating characteristics.

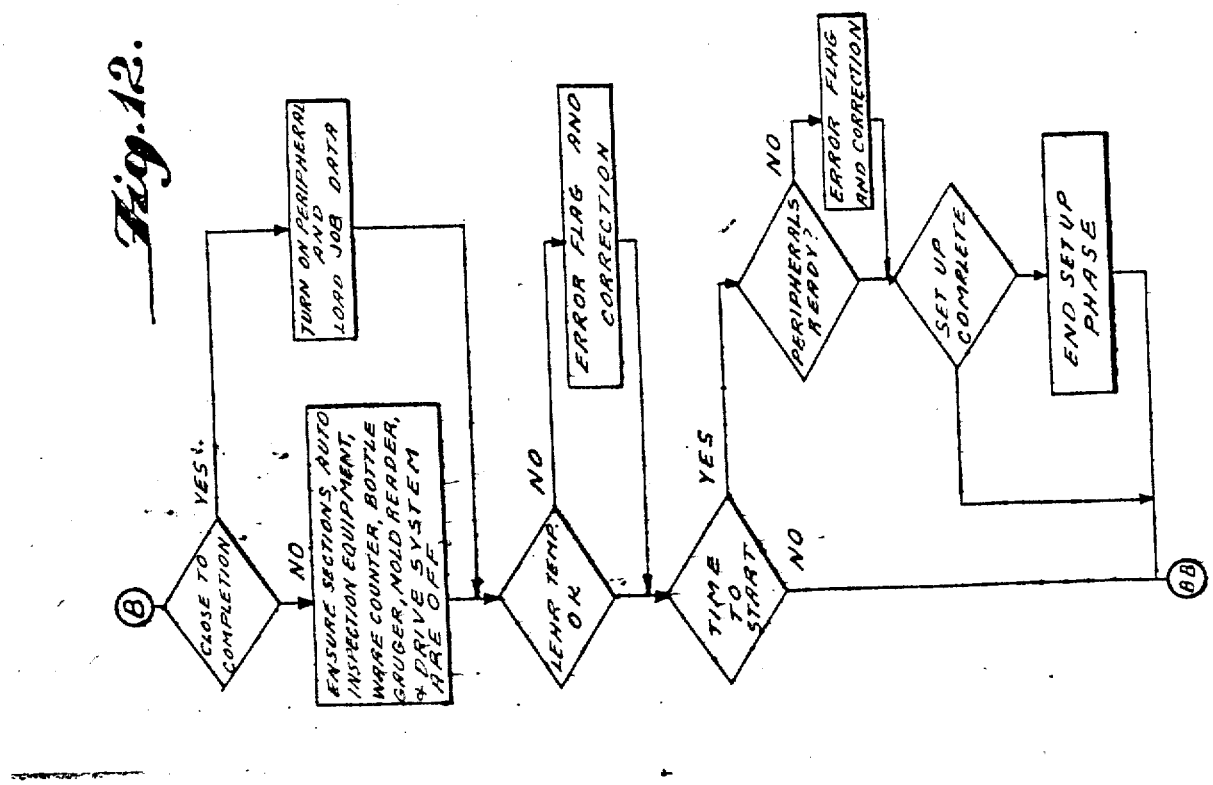

What is claimed:

1. In a glassware forming system having at least one furnace for converting raw materials into molten glass, at least one forehearth for controllably cooling said molten glass to a predetermined temperature, means for forming gobs of molten glass, a plurality of IS machines, each IS machine having a plurality of individual sections, each of said sections performing a plurality of functions to convert said gobs of molten glass to glass containers, a lehr and means for conveying said containers from said IS machines to said lehr, a control system comprising:

- a plurality of section control means, each of said plurality of section control means being associated with a different one of said plurality of sections of said plurality of IS machines for controlling the operation of its respective section in said glassware forming system, said section control means controlling both the timing and phase relationship between each of the sections of each of said plurality of machines;
- a plurality of machine control means, each of said plurality of machine control means being associated with a different one of said plurality of IS machines and being in communication with each of the section control means of its respective machine for controlling each of the section control means of its respective IS machine, each of said plurality of said machine control means including means for varying the timing and the phase relationship of each of the sections of its respective IS machine and including means for controlling the speed of its respective machine;
- a console computer in communication with each of said plurality of machine control means and monitoring said plurality of machine control means for controlling the job scheduling for each of said plurality of machines, said console computer receiving job status reports from each of said plurality of machine control means; and
- a factory supervisory computer in communication with said console computer to manage information on raw material inventory, glassware inventory, the status of jobs being run in each stop, factory maintenance, and job scheduling data, and to determine and provide to the console computer instructions to load said machine control means in response to operator instructions or to predicted job termination data, and to provide information for the control of raw materials inventory, furnace operation and glassware inventory warehousing.

2. The control system of claim 1 further comprising means associated with each of said IS machines operative when power is applied to one of said machines for initiating job implementation; and means for recovering from a power failure including:
   means associated with each of said machines for emergency-stopping the associated ones of said machines; and
   means operative after a predetermined period of time for obtaining speed, timing and phase information from each of said section control means associated with a machine undergoing a power failure, storing said speed, timing and phase information in nonvolatile storage, indicating the occurrence of a power failure, and removing any remaining power from a machine undergoing a power failure;
   said job initiating means being responsive to said indicating means when power is applied to an associated machine and, if said indicator does not exist, providing the respective sections of the associated machine with said speed, timing and phase information stored in said nonvolatile storage and, if said indicator does exist, requesting job information from said job implementing means.

3. The control system as in claim 1 further comprising, in association with each of said sections of said plurality of IS machines:
   means for varying the relative occurrence of discrete functions in the operating cycle of an associated section and the phasing of an associated section with respect to other sections of an associated machine;
   means for monitoring preselected discrete functions of an associated section to obtain first sensed information;
   said section control means being responsive to said first sensed information to stop the operation of an associated section when an error is indicated; and
   means for adjusting the operating characteristics of selected components of the associated section.

4. The glassware forming system of claim 1 wherein said factory supervisory computer includes:
   means for storing information relating to the proportion of raw material to be used in each of a plurality of jobs;
   means receiving said stored information for a selected job for generating commands to a mixing means;
   mixing means for mixing said raw materials in the proportion required for said selected job; and
   means for conveying said mixed raw materials to a furnace.

5. The system of claim 4 further comprising means for converting said mixed raw materials to briquettes;
   means for storing said briquettes; and
   means for controllably conveying said briquettes to said furnace at a rate corresponding to the rate of consumption of said molten glass formed by said furnace.

6. The system of claim 5 further comprising means for determining the quantity of glass being converted into glassware containers, and means responsive to said determining means for conveying an amount of mixed raw materials to said furnace corresponding to said predetermined quantity of glass.

7. A system for forming glassware from raw materials, comprising:
   a plurality of glassware-forming machines, each machine including a plurality of independently operating sections for the formation of glassware articles from gobs of glass;
   a furnace to produce molten glass from raw material;
   means to produce gobs of glass from the molten glass and to feed the glass gobs to sections of the glassware-forming machines;
   section controllers for controlling the operation of each section of the plurality of glassware-forming machines, each section controller including a section computer to stop, or control the initiation of, section operation depending upon the presence of a gob in the section and to receive, store, and control section operation with instructions for timing and phasing of the section;
   a shop computer associated with each machine, each shop computer communicating with the section controllers of its respective machine to provide first information including instructions to the section controllers of its respective machine in accordance with job history information, and to monitor inputs to the glassware-forming machine sections and glassware outputs, and to provide information outputs indicating the need for adjustment of section inputs for the operation of section components in response to instructions stored in the shop computer;

a console computer for managing second information including a plurality of job history information sets and, in response to received instructions, to communicate job history information to either the shop computers and/or one or more specified section controllers of one or more specified glassware-forming machines to start, create, or modify a job, and to manage the shop computers, and to provide management information for startup, operation, and shutdown of the shop, and to service status information from the shop computers on the shop system and on job operation and completion; and a factory supervisory computer in communication with said console computer to manage information on raw material inventory, glassware inventory, the status of jobs being run in each shop, factory maintenance, and job scheduling data, and to determine and provide to the console computer instructions to load shop computers in response to operator instructions or to predicted job termination data, and to provide information for the control of raw materials inventory, furnace operation and glassware inventory warehousing.

8. A method for forming glassware containers from raw materials in a glassware container forming system comprising:

storing information relating to the proportion of raw materials to be used in each of a plurality of jobs;

selecting one of said plurality of jobs;

generating commands to a mixing means to cause said mixing means to mix said raw materials in the proportion required for said selected job;

controllably conveying said mixed raw materials to a furnace to be converted into molten glass;

converting said molten glass into glassware containers; and determining the quanity of glass being converted into glassware containers, wherein said step of controllably conveying said mixed raw materials to a furnace comprises the step of conveying an amount of mixed raw materials to said furnace corresponding to said quantity of glass being converted into glassware containers.

9. The method of claim 8 further including the steps of converting said mixed raw materials to briquettes and storing said briquettes; and wherein said step of controllably conveying said mixed raw materials to a furnace comprises the step of controllably conveying said briquettes to said furnace at a rate corresponding to the rate of consumption of said molten glass formed by said furnace.

* * * * *

UNITED STATES PATENT AND TRADEMARK OFFICE
CERTIFICATE OF CORRECTION

PATENT NO. : 4,457,772

DATED : JULY 3, 1984

INVENTOR(S) : JAMES D. HAYNES; JEROME A. KWIATKOWSKI; GLEN H. MAPES

It is certified that error appears in the above-identified patent and that said Letters Patent is hereby corrected as shown below:

```
    Delete FIGS. 1-10 as shown on Sheet 1 of 5
through Sheet 5 of 5 and insert the attached
drawings as shown.
```

*Signed and Sealed this*

*Fifth* Day of *March 1985*

[SEAL]

*Attest:*

DONALD J. QUIGG

*Attesting Officer*     *Acting Commissioner of Patents and Trademarks*

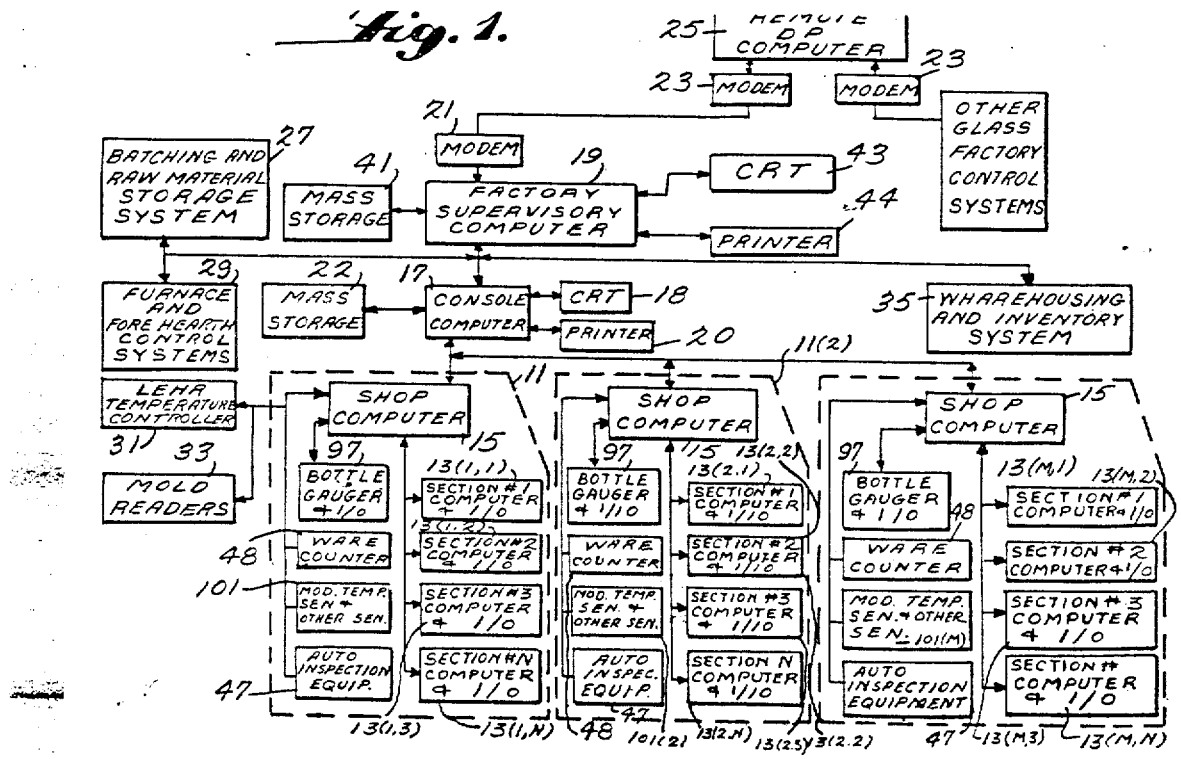

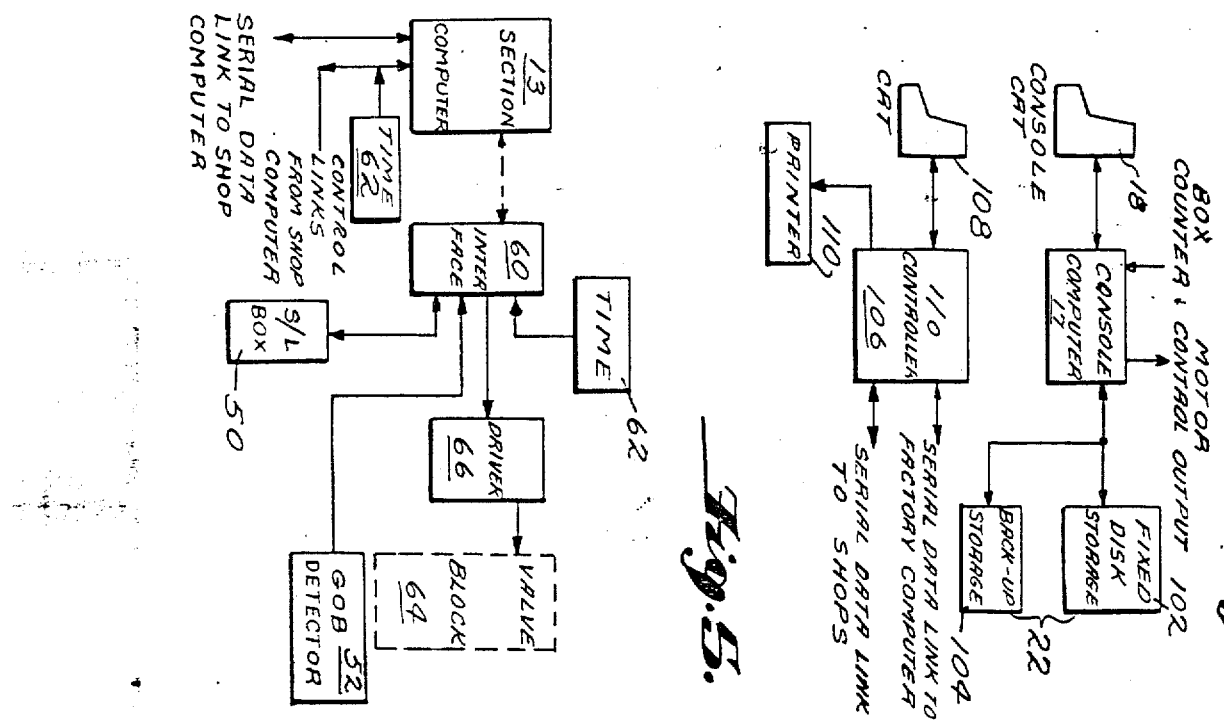

Batching/Raw Material Control System

LEHR TEMPERATURE CONTROLLER